US010562705B2

(12) United States Patent
Pankratov et al.

(10) Patent No.: US 10,562,705 B2
(45) Date of Patent: *Feb. 18, 2020

(54) STORAGE AND RETRIEVAL SYSTEM

(71) Applicant: Symbotic, LLC, Wilmington, MA (US)

(72) Inventors: Kirill K. Pankratov, Acton, MA (US); Larry M. Sweet, Atlanta, GA (US); Juergen D. Conrad, York, PA (US); John F. Keating, Billerica, MA (US); Matt Gates, Pascoag, RI (US)

(73) Assignee: SYMBOTIC, LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,088

(22) Filed: Feb. 6, 2018

(65) Prior Publication Data

US 2018/0155128 A1 Jun. 7, 2018

Related U.S. Application Data

(63) Continuation of application No. 14/966,978, filed on Dec. 11, 2015, now Pat. No. 9,884,719.

(Continued)

(51) Int. Cl.
B65G 1/04 (2006.01)
B65G 1/137 (2006.01)

(52) U.S. Cl.
CPC ......... *B65G 1/0492* (2013.01); *B65G 1/1378* (2013.01)

(58) Field of Classification Search
CPC .. B65G 1/0414; B65G 1/0492; B65G 1/1373; B65G 1/1378
See application file for complete search history.

(56) References Cited

U.S. PATENT DOCUMENTS 2,945,604 A 7/1960 Kroll et al.
2,996,621 A 8/1961 Barret, Jr.
(Continued)

FOREIGN PATENT DOCUMENTS

AT 506221 7/2009
CA 1252430 4/1989
(Continued)

OTHER PUBLICATIONS

International Search Report, International Application No. PCT/US2015/065574, dated Feb. 12, 2016.
(Continued)

*Primary Examiner* — Kaitlin S Joerger
(74) *Attorney, Agent, or Firm* — Perman & Green, LLP

(57) ABSTRACT

A storage array in an automated storage and retrieval system includes storage spaces arrayed on racks along picking aisles, multiple level decks, where at least one deck communicates with each aisle, where the decks and aisles are configured to define a rolling surface for an autonomous transport vehicle at each level of the decks, racks along at least one aisle at each level are at multiple rack levels that are accessed from a respective rolling surface that is common to the multiple rack levels, and a vertical pitch between rack levels varies for a portion of a respective aisle, the vertical pitch between at least two rack levels of the portion of the respective aisle is related to another vertical pitch between at least two other rack levels of another aisle portion of the respective aisle so the vehicle effects multiple picks in ordered sequence in a common aisle pass.

20 Claims, 20 Drawing Sheets

Related U.S. Application Data

(60) Provisional application No. 62/091,162, filed on Dec. 12, 2014.

(56) References Cited

U.S. PATENT DOCUMENTS

| | | | |
|---|---|---|---|
| 3,455,468 A | 7/1969 | Saul | |
| 3,554,390 A | 1/1971 | Saul | |
| 3,677,421 A | 7/1972 | Kintner et al. | |
| 3,737,056 A | 6/1973 | Hathcock, Jr. | |
| 3,802,580 A | 4/1974 | Castaldi | |
| 3,970,840 A | 7/1976 | De Bruine | |
| 4,001,139 A | 1/1977 | Long | |
| 4,406,570 A | 9/1983 | Duncan et al. | |
| 4,428,708 A | 1/1984 | Burt | |
| 4,492,504 A | 1/1985 | Hainsworth | |
| 4,595,329 A | 6/1986 | Marques | |
| 4,678,390 A | 7/1987 | Bonneton et al. | |
| 4,679,149 A | 7/1987 | Merz | |
| 4,716,530 A | 12/1987 | Ogawa et al. | |
| 4,786,229 A | 11/1988 | Henderson | |
| 4,811,229 A | 3/1989 | Wilson | |
| 4,936,738 A * | 6/1990 | Brennan | B65G 1/02 414/267 |
| 5,134,353 A | 7/1992 | Kita et al. | |
| 5,134,940 A | 8/1992 | Fujita et al. | |
| 5,135,344 A | 8/1992 | Kita et al. | |
| 5,179,329 A | 1/1993 | Nishikawa et al. | |
| 5,273,392 A | 12/1993 | Bernard, II et al. | |
| 5,333,982 A | 8/1994 | Tanizawa et al. | |
| 5,370,492 A | 12/1994 | Gleyze et al. | |
| 5,379,229 A | 1/1995 | Parson et al. | |
| 5,380,139 A * | 1/1995 | Pohjonen | B65G 1/0435 414/273 |
| 5,403,147 A | 4/1995 | Tanaka | |
| 5,425,612 A | 6/1995 | Ebstein | |
| 5,472,309 A | 12/1995 | Bernard, II et al. | |
| 5,525,884 A | 6/1996 | Sugiura et al. | |
| 5,529,165 A | 6/1996 | Shupert | |
| 5,601,395 A | 2/1997 | Litchi, Sr. et al. | |
| 5,718,551 A | 2/1998 | Ebstein | |
| 5,764,014 A | 6/1998 | Jakeway et al. | |
| 5,801,506 A | 9/1998 | Netzler | |
| 5,833,431 A | 11/1998 | Rosse, II et al. | |
| 5,839,872 A | 11/1998 | Goto et al. | |
| 5,988,306 A | 11/1999 | Ooishi | |
| 6,036,427 A | 3/2000 | Kita et al. | |
| 6,061,607 A | 5/2000 | Bradley et al. | |
| 6,272,406 B2 | 8/2001 | Alofs et al. | |
| 6,325,586 B1 | 12/2001 | Loy | |
| 6,341,269 B1 | 1/2002 | Burrows | |
| 6,345,217 B1 | 2/2002 | Zeitler et al. | |
| 6,721,638 B2 | 4/2004 | Zeitler | |
| 6,748,292 B2 | 6/2004 | Mountz | |
| 6,923,612 B2 | 8/2005 | Hansl | |
| 6,929,440 B1 | 8/2005 | Grond | |
| 6,950,722 B2 | 9/2005 | Mountz | |
| 7,008,164 B2 | 3/2006 | Rokkaku | |
| 7,025,191 B2 | 4/2006 | Litchi et al. | |
| 7,266,422 B1 | 9/2007 | Demotte et al. | |
| 7,329,081 B2 | 2/2008 | Baker et al. | |
| 7,402,018 B2 | 7/2008 | Mountz et al. | |
| 7,495,561 B2 | 2/2009 | Bodin et al. | |
| 7,931,431 B2 | 4/2011 | Benedict et al. | |
| 8,425,173 B2 * | 4/2013 | Lert | B25G 1/045 414/280 |
| 8,480,347 B2 | 7/2013 | Schafer | |
| 8,594,835 B2 | 11/2013 | Lert et al. | |
| 8,596,952 B2 | 12/2013 | Wolkerstrofer | |
| 8,740,542 B2 | 6/2014 | Wolkerstrofer | |
| 8,790,061 B2 | 7/2014 | Yamashita | |
| 8,894,344 B2 * | 11/2014 | Merry | H01L 21/67769 414/281 |
| 8,954,188 B2 * | 2/2015 | Sullivan | G06Q 10/08 700/214 |
| 8,956,099 B2 | 2/2015 | Olszak et al. | |
| 8,974,168 B2 | 3/2015 | Yamashita | |
| 9,008,884 B2 * | 4/2015 | Toebes | B65G 1/0492 701/23 |
| 9,037,286 B2 * | 5/2015 | Lert | B65G 1/1378 700/216 |
| 9,315,323 B2 | 4/2016 | Schubilske | |
| 9,321,591 B2 * | 4/2016 | Lert | B65G 1/0492 |
| 9,409,728 B2 | 8/2016 | Bastian, II | |
| 9,499,338 B2 | 11/2016 | Toebes et al. | |
| 9,505,556 B2 | 11/2016 | Razumov | |
| 9,856,083 B2 | 1/2018 | Conrad et al. | |
| 2002/0029719 A1 | 3/2002 | Matsukawa | |
| 2002/0076307 A1 | 6/2002 | Fallin et al. | |
| 2003/0033217 A1 | 2/2003 | Cutlip | |
| 2003/0185656 A1 | 10/2003 | Hansl | |
| 2003/0200129 A1 | 10/2003 | Klaubauf et al. | |
| 2004/0093116 A1 | 5/2004 | Mountz | |
| 2004/0197171 A1 | 10/2004 | Freudelsperger | |
| 2004/0238326 A1 | 12/2004 | Litchi | |
| 2005/0158154 A1 | 7/2005 | Leerintveld et al. | |
| 2006/0245862 A1 | 11/2006 | Hansl et al. | |
| 2006/0257236 A1 | 11/2006 | Stingel, III et al. | |
| 2007/0021864 A1 | 1/2007 | Mountz et al. | |
| 2007/0068770 A1 | 3/2007 | Koide et al. | |
| 2007/0177011 A1 | 8/2007 | Lewin et al. | |
| 2007/0288123 A1 | 12/2007 | D'Andrea et al. | |
| 2007/0290040 A1 | 12/2007 | Wurman et al. | |
| 2007/0293978 A1 | 12/2007 | Wurman et al. | |
| 2008/0001372 A1 | 1/2008 | Hoffman et al. | |
| 2008/0166217 A1 | 7/2008 | Fontana | |
| 2008/0215180 A1 | 9/2008 | Kota | |
| 2009/0074545 A1 | 3/2009 | Lert, Jr. et al. | |
| 2009/0114115 A1 | 5/2009 | Minges | |
| 2009/0185884 A1 | 7/2009 | Wurman et al. | |
| 2009/0308000 A1 | 12/2009 | Corcoran | |
| 2010/0272546 A1 | 10/2010 | Wolkerstorfer | |
| 2010/0316468 A1 | 12/2010 | Lert | |
| 2010/0316469 A1 | 12/2010 | Lert | |
| 2012/0141236 A1 | 6/2012 | Korner | |
| 2012/0185082 A1 * | 7/2012 | Toebes | B65G 1/0492 700/218 |
| 2012/0185122 A1 | 7/2012 | Sullivan et al. | |
| 2012/0186192 A1 | 7/2012 | Toebes et al. | |
| 2012/0186942 A1 | 7/2012 | Toebes et al. | |
| 2012/0189409 A1 | 7/2012 | Toebes et al. | |
| 2012/0189416 A1 | 7/2012 | Toebes | |
| 2012/0195720 A1 | 8/2012 | Sullivan et al. | |
| 2012/0328397 A1 | 12/2012 | Yamashita | |
| 2012/0330458 A1 | 12/2012 | Weiss | |
| 2013/0129453 A1 | 5/2013 | Salichs | |
| 2013/0209202 A1 | 8/2013 | Schmit et al. | |
| 2013/0245810 A1 | 9/2013 | Sullivan et al. | |
| 2014/0044506 A1 | 2/2014 | De Vries | |
| 2014/0056672 A1 | 2/2014 | Mathys et al. | |
| 2014/0100999 A1 | 4/2014 | Mountz et al. | |
| 2014/0124462 A1 * | 5/2014 | Yamashita | B65G 1/0414 211/1.57 |
| 2014/0277692 A1 | 9/2014 | Buzan et al. | |
| 2014/0350717 A1 | 11/2014 | Dagle et al. | |
| 2015/0098775 A1 | 4/2015 | Razumov | |
| 2015/0225187 A1 | 8/2015 | Razumov | |
| 2016/0016731 A1 | 1/2016 | Razumov | |
| 2016/0167880 A1 * | 6/2016 | Pankratov | B65G 1/0492 414/281 |
| 2016/0207709 A1 | 7/2016 | Pankratov et al. | |
| 2016/0207710 A1 * | 7/2016 | Conrad | B65G 1/0485 |
| 2016/0207711 A1 | 7/2016 | Pankratov et al. | |
| 2016/0214797 A1 * | 7/2016 | Pankratov | B65G 1/0492 |
| 2016/0214808 A1 * | 7/2016 | Cyrulik | B65G 1/1373 |

FOREIGN PATENT DOCUMENTS

| | | |
|---|---|---|
| CN | 102822073 | 12/2012 |
| CN | 102887319 | 1/2018 |
| DE | 4104527 | 8/1992 |
| DE | 10142395 | 11/2002 |
| DE | 2011106677 | 1/2013 |

(56) References Cited

FOREIGN PATENT DOCUMENTS

| | | |
|---|---|---|
| EP | 0169156 | 1/1986 |
| EP | 0737630 | 10/1996 |
| EP | 1775240 | 4/2007 |
| FR | 2730715 | 8/1996 |
| GB | 2407565 | 5/2005 |
| JP | 5231548 | 8/1977 |
| JP | 2014503440 | 2/2014 |
| JP | 2014091698 | 5/2014 |
| WO | 9534491 | 12/1995 |
| WO | 2004103883 | 12/2004 |
| WO | 2005009324 | 2/2005 |
| WO | 2009150684 | 12/2009 |
| WO | 2012156355 | 11/2012 |
| WO | 2013004695 | 1/2013 |
| WO | 2014145450 | 9/2014 |
| WO | 20160115565 | 7/2016 |

OTHER PUBLICATIONS

International Search Report, International Application No. PCT/US2016/013877, dated May 20, 2016.
International Search Report, International Application No. PCT/US2016/014747, dated May 17, 2016.
Extended European Search Report, European Application No. 15868185.8, dated Oct. 2, 2018.

\* cited by examiner

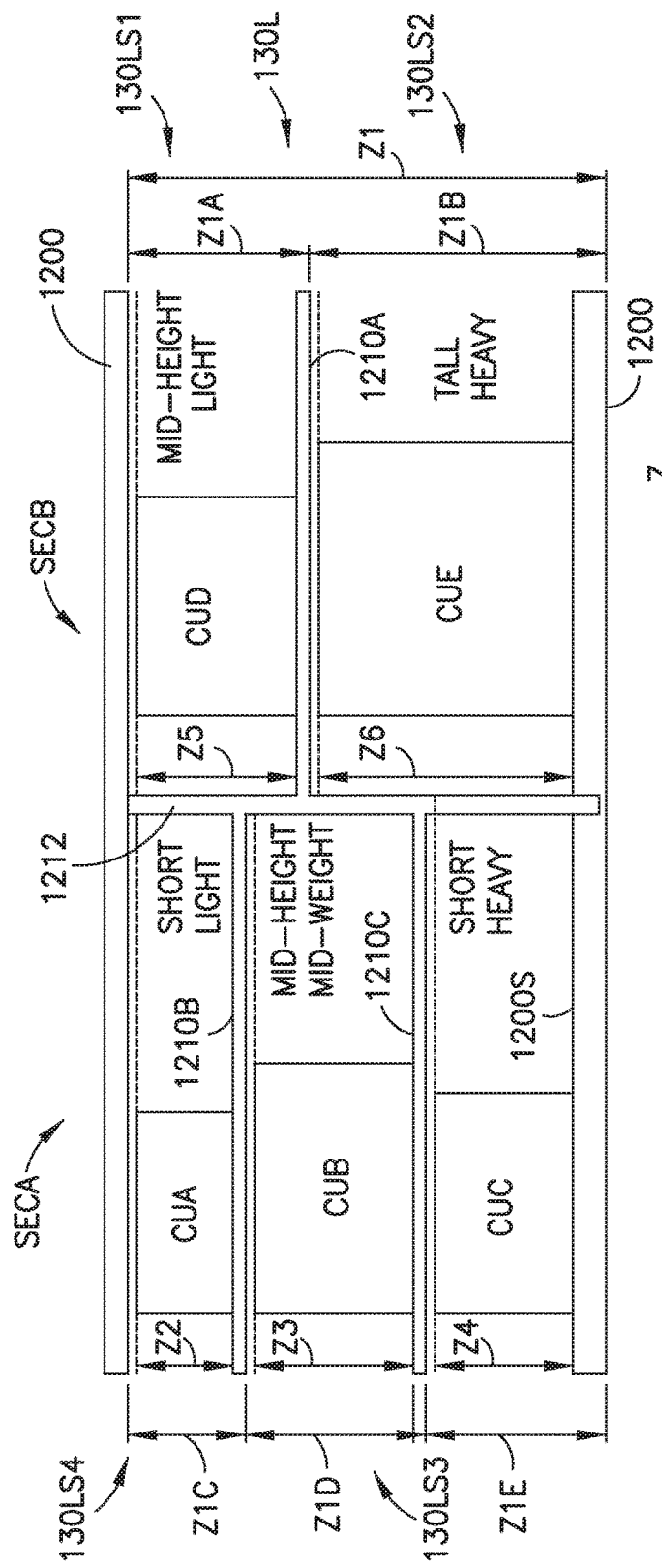
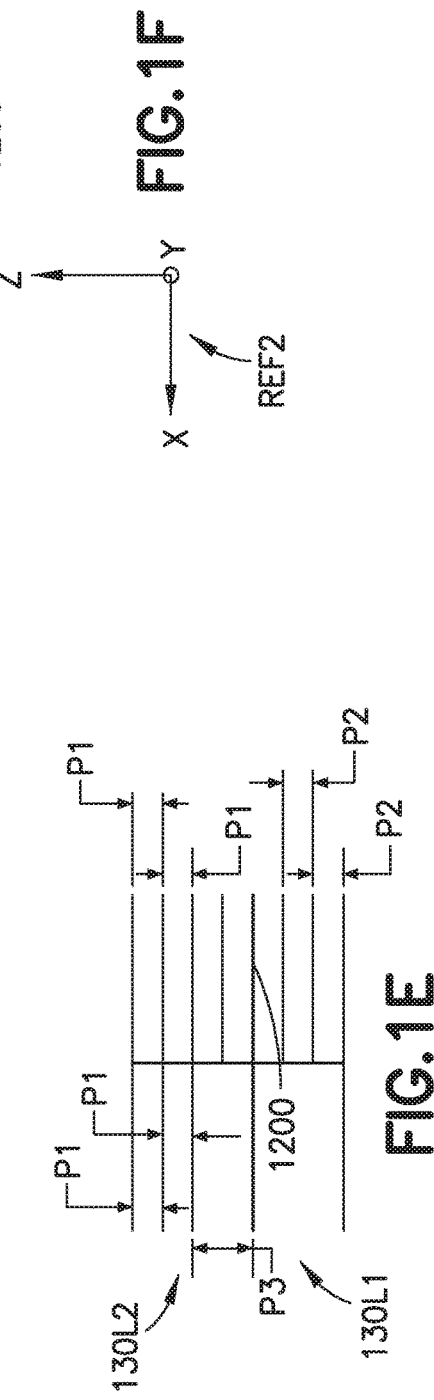
FIG. 1F
FIG. 1E

STORAGE AND RETRIEVAL SYSTEM

CROSS-REFERENCE TO RELATED APPLICATIONS

This application is a continuation of U.S. patent application Ser. No. 14/966,978, filed Dec. 11, 2015 (now U.S. Pat. No. 9,884,719, issued Feb. 6, 2018), which claims priority from and the benefit of U.S. Provisional Patent Application No. 62/091,162, filed on Dec. 12, 2014, the disclosures of which are incorporated by reference herein in their entireties.

BACKGROUND

1. Field

The exemplary embodiments generally relate to material handling systems and, more particularly, to transport and storage of items within the material handling system.

2. Brief Description of Related Developments

Multilevel storage and retrieval systems may be used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Goods stored within the storage and retrieval system are generally stored in storage spaces on each storage level such that a transport vehicle disposed on that level has access to one level of storage spaces. In some instances goods stored in the storage spaces do not occupy the entire storage space allocated to the goods which results in inefficient use of the storage space.

It would be advantageous to increase storage density within a storage and retrieval system.

BRIEF DESCRIPTION OF THE DRAWINGS

The foregoing aspects and other features of the disclosed embodiment are explained in the following description, taken in connection with the accompanying drawings, wherein:

FIGS. 1E and 1F are schematic illustrations of portions of the storage and retrieval system in accordance with aspects of the disclosed embodiment;

DETAILED DESCRIPTION

Figure 1:
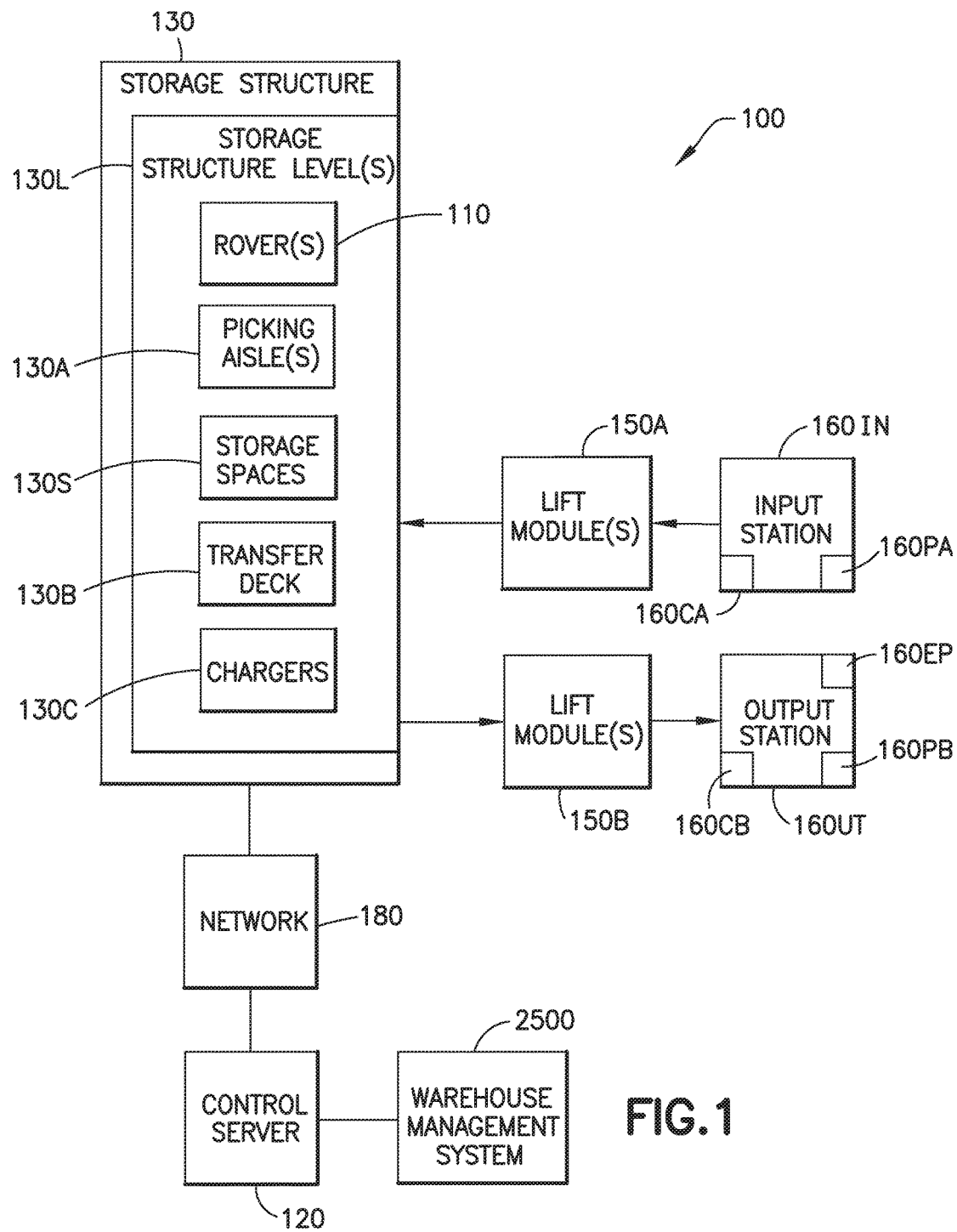
FIG. 1 is a schematic illustration of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 1A:
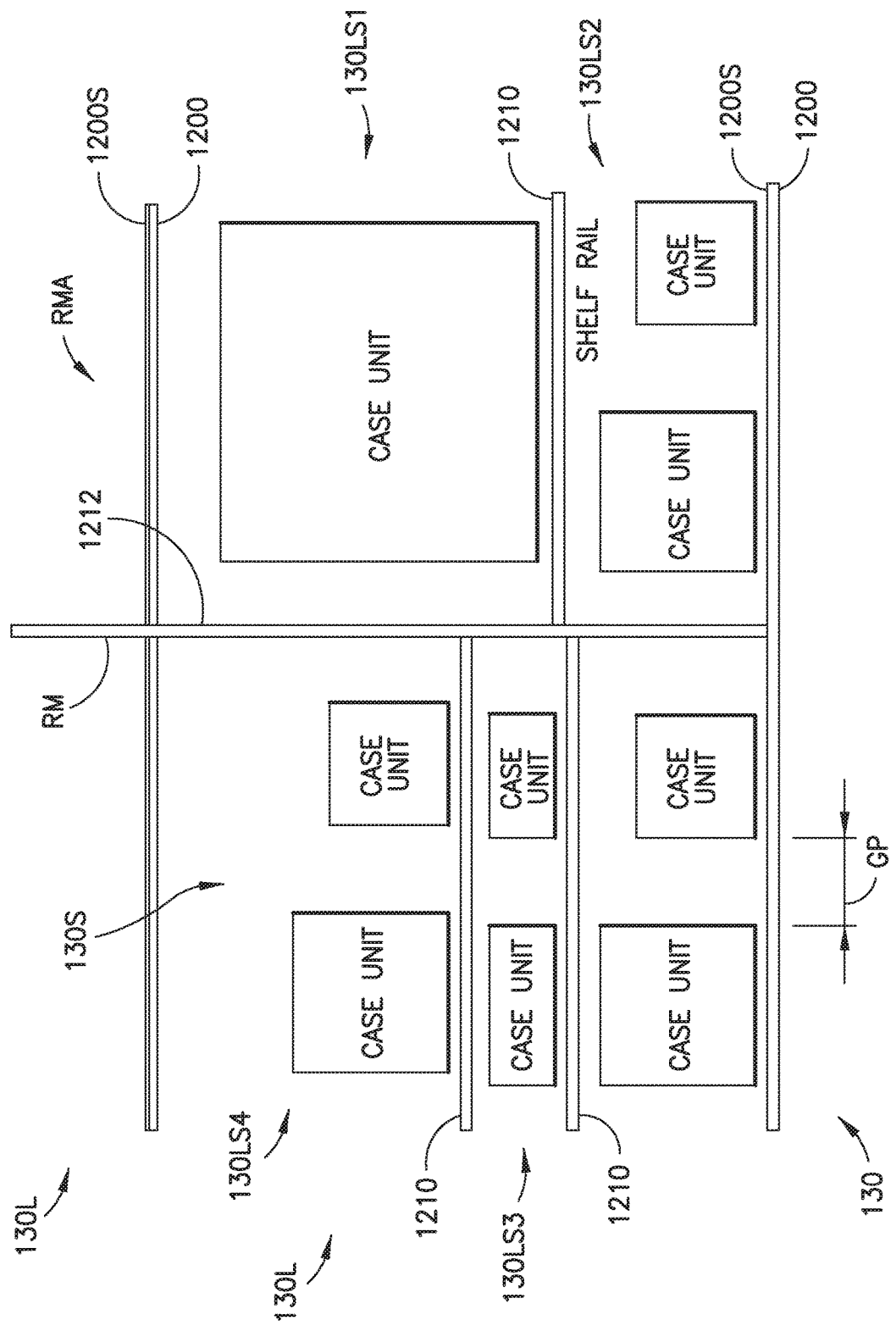
FIGS. 1A and 1B are schematic illustrations of portions of the automated storage and retrieval system in accordance with aspects of the disclosed embodiment.
Figure 1B:
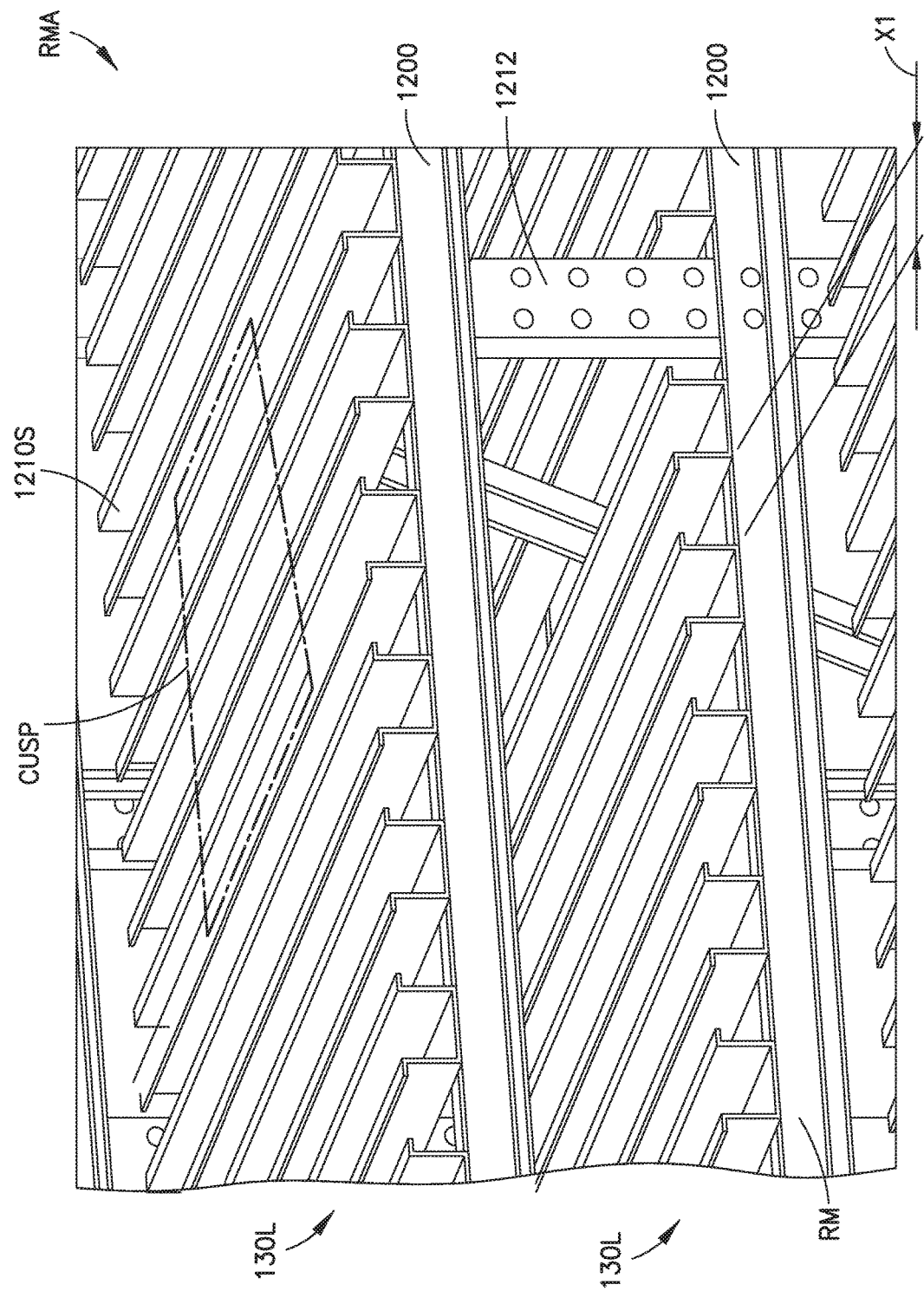
Figure 1C:
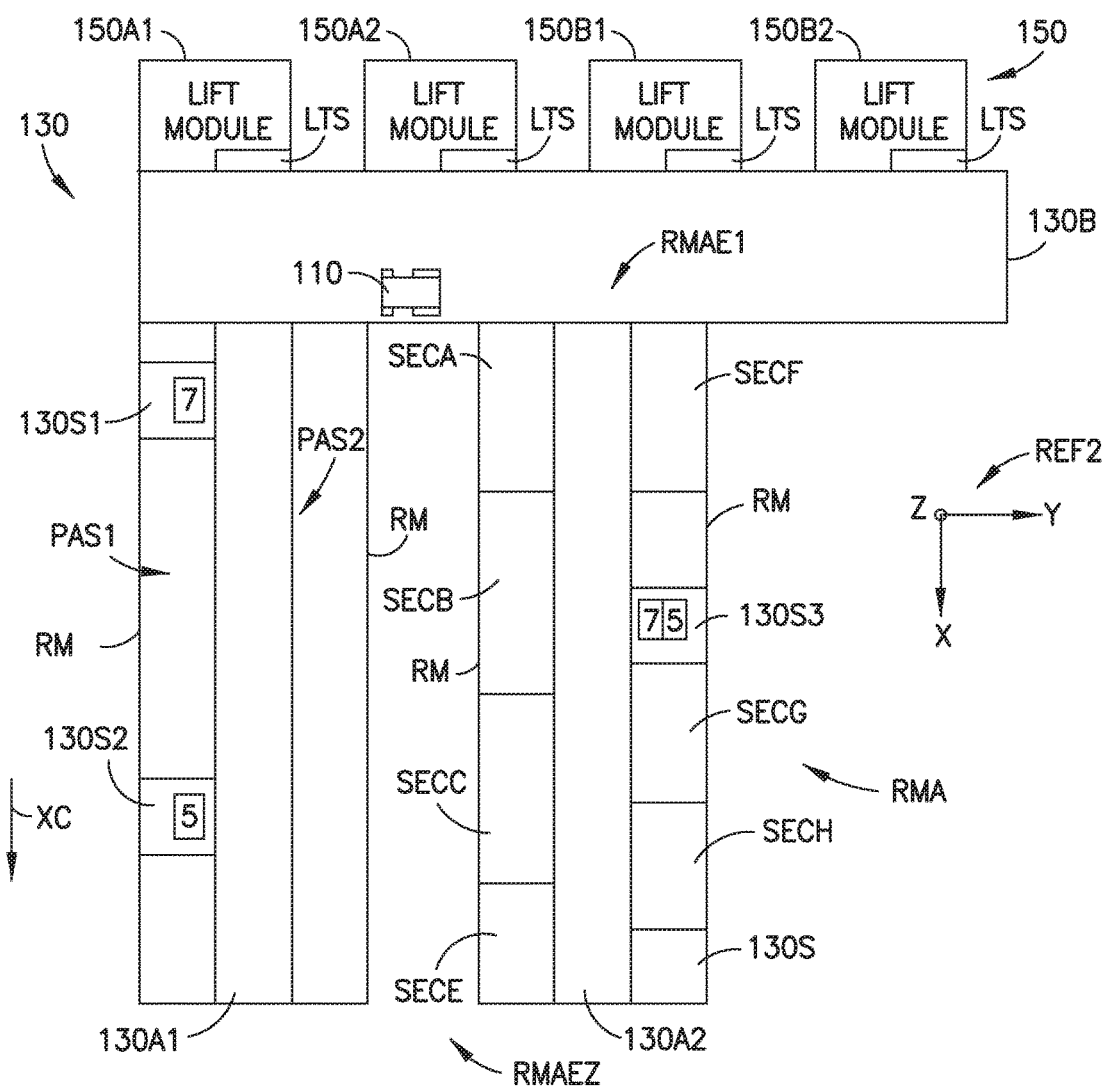
FIG. 1C is a schematic illustration of the storage and retrieval system in accordance with aspects of the disclosed embodiment.
Figure 1D:
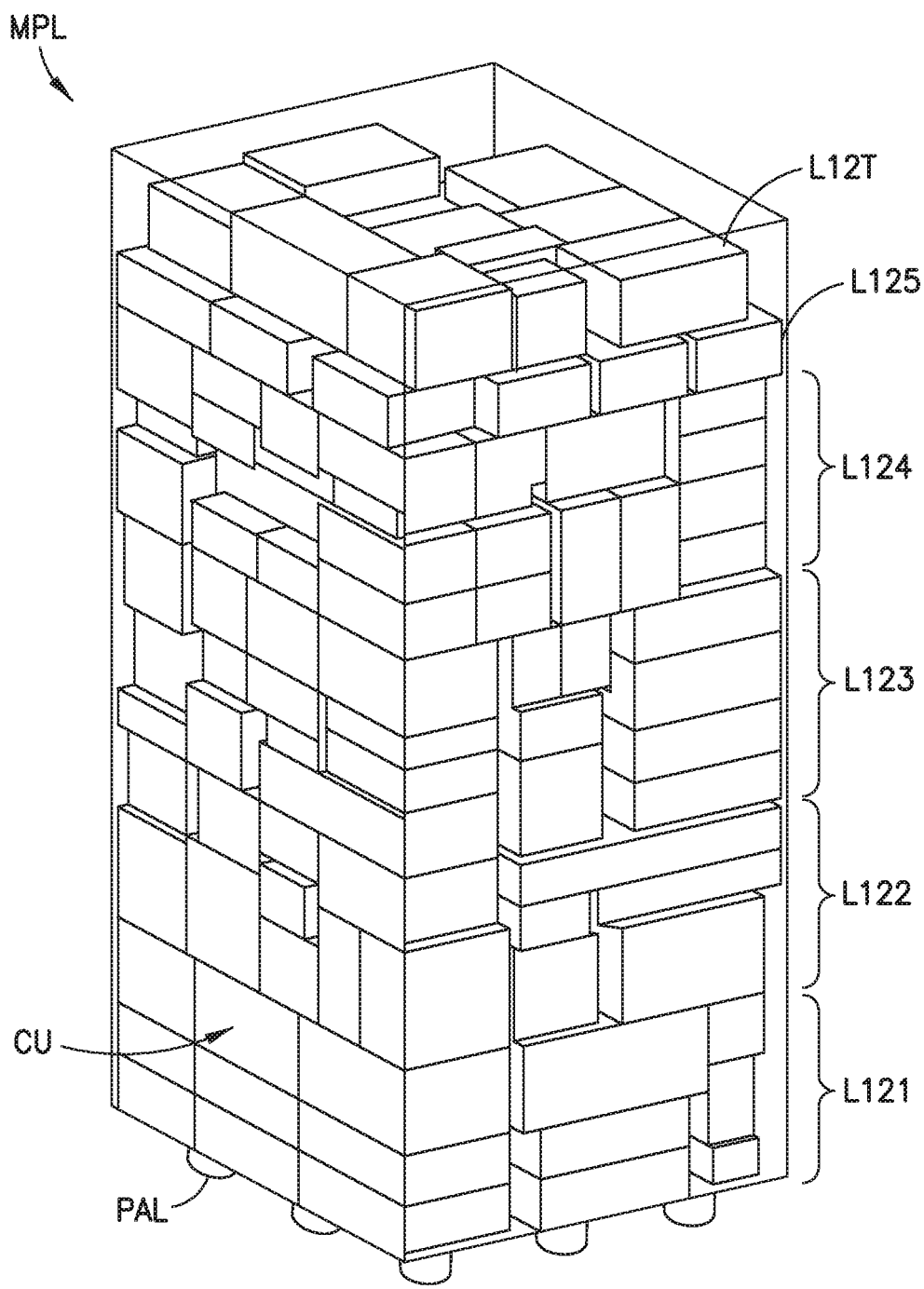
FIG. 1D is a schematic illustration of a mixed pallet load formed by the storage and retrieval system in accordance with aspects of the disclosed embodiment.
Figure 15:
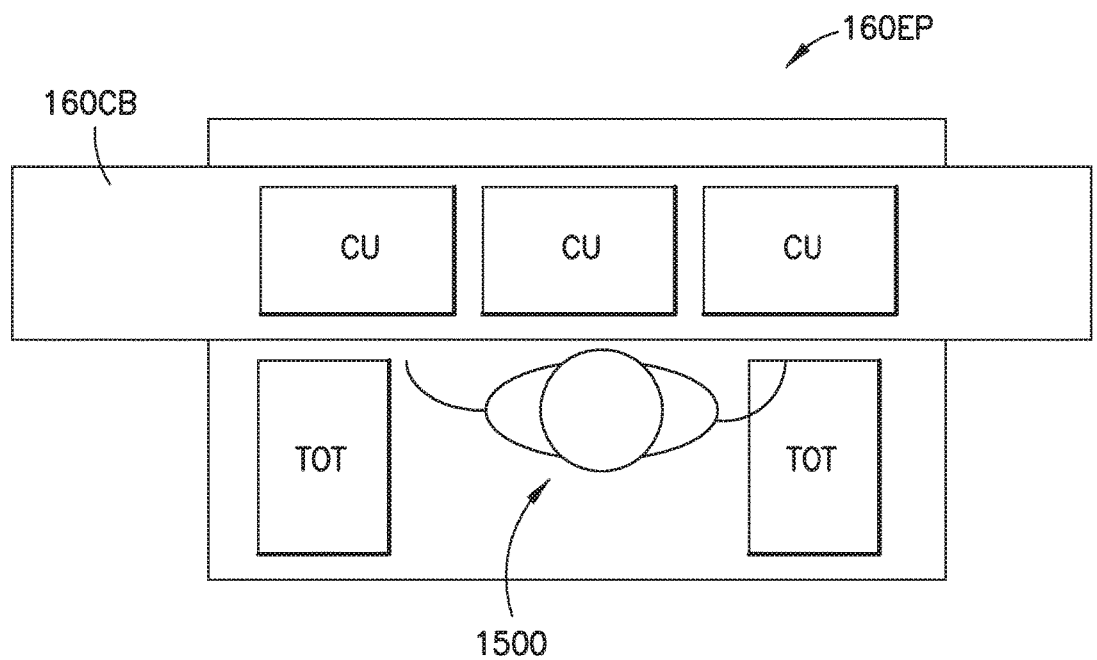
FIG. 15 is a schematic illustration of an operator station of the storage and retrieval system in accordance with aspects of the disclosed embodiment.

Also referring to FIG. 1D, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In the exemplary embodiment, the storage and retrieval system 100 may be configured to generally include an in-feed section, a storage and sortation section and an output section as will be described in greater detail below. As may be realized, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized, as illustrated in FIG. 15, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in a bag, tote or other suitable container TOT by an operator 1500, or any suitable automation, to fulfill a customer order according to, for example, an order in which the case units CU are sequenced at the operator station 160EP, noting that the sequencing of the case units CU as described herein effects the sequencing of the case units CU at the operator station 160EP.

The in-feed section may generally be capable of resolving the uniform pallet loads to individual cases, and transporting the cases via suitable transport, for input to the storage and sortation section. The storage and sortation section in turn may receive individual cases, store them in a storage area and retrieve desired cases individually in accordance with commands generated in accordance to orders entered into a warehouse management system for transport to the output section. The sorting and grouping of cases according to order (e.g. an order out sequence) may be performed in whole or in part by either the storage and retrieval section or the output section, or both, the boundary between being one of convenience for the description and the sorting and grouping being capable of being performed any number of ways. The intended result is that the output section assembles the appropriate group of ordered cases, that may be different in SKU, dimensions, etc. into, in one aspect, mixed case pallet loads in the manner described in, for example, U.S. patent application Ser. No. 13/654,293 filed on Oct. 17, 2012 the disclosure of which is incorporated herein by reference in its entirety, while in other aspects the output section assembles the appropriate group of ordered case units, that may be different in SKU, dimensions, etc. into bags, totes or other suitable containers to fulfill a customer order at the operator station 160EP.

In one aspect of the exemplary embodiment, the output section generates the pallet load in what may be referred to as a structured architecture of mixed case stacks. The structured architecture of the pallet load may be characterized as having several flat case layers L121-L125, L12T, at least one of which is formed of non-intersecting, freestanding and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. In other aspects the load fill of mixed cases may be configured in any other suitable ordered sequence and may be loaded on or in any suitable transport device such as, for example, a bag, tote, shopping carriage, a truck or other suitable container fill without palletization. As will be described below, in one aspect, the storage and retrieval system outputs case units to the output section so that the two parts of the 3-D pallet load solution are resolved, while in other aspects the storage and retrieval system outputs case units to the output section according to a sequence for filling non-palletized customer orders at the operator station 160EP.

In accordance with aspects of the disclosed embodiment the automated storage and retrieval system 100 includes input stations 160IN (which include depalletizers 160PA and/or conveyors 160CA for transporting items to lift modules for entry into storage) and output stations 160UT (which include palletizers 160PB, operator stations 160EP, and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous rovers or transport vehicles 110 (referred to herein as "bots"). As used herein the lift modules 150, storage structure 130 and bots 110 may be collectively referred to herein as the storage and sorting section noted above. It is also noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL for shipping.

Also referring to FIG. 1C, the storage structure 130 may include multiple storage rack modules RM, configured in a three dimensional array RMA, that are accessible by storage or deck levels 130L. Each storage level 130L includes storage spaces 130S formed by the rack modules RM where the rack modules include shelves that are disposed along storage or picking aisles 130A which, e.g., extend linearly through the rack module array RMA and provide access to the storage spaces 130S and transfer deck(s) 130B over which the bots 110 travel on a respective storage level 130L for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side of the storage rack array RMAE1 or at several ends or sides RMAE1, RMAE2 of the storage rack array as described in, for example, U.S. patent application Ser. No. 13/326,674 filed on Dec. 15, 2011 the disclosure of which is incorporated herein by reference in its entirety.

The transfer decks 130B are substantially open and configured for the undeterministic traversal of bots 110 across and along the transfer decks 130B. As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L to access the storage spaces 130S disposed in the rack shelves alongside each of the picking aisles 130A (e.g. bots 110 may access storage spaces 130S distributed on both sides of each aisle such that the bot 110 may have a different facing, as will be described in greater detail below, when traversing each picking aisle 130A). As noted above, the transfer deck(s) 130B also provide bot 110 access to each of the lifts 150 on the respective storage level 130L where the lifts 150 feed and remove case units to and/or from each storage level 130L where the bots 110 effect case unit transfer between the lifts 150 and the storage spaces 130S. Each storage level 130L may also include charging stations 130C for charging an on-board power supply of the bots 110 on that storage level 130L such as described in, for example, U.S. patent application Ser. No. 14/209,086 filed on Mar. 13, 2014 and Ser. No. 13/326,823 filed on Dec. 15, 2011 the disclosures of which are incorporated herein by reference in their entireties.

The bots 110 may be any suitable independently operable autonomous transport vehicles that carry and transfer case units throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; U.S. patent application Ser. No. 13/326,993 filed on Dec. 15, 2011; U.S. patent application Ser. No. 14/486,008 filed on Sep. 15, 2014); and U.S. provisional patent application No. 62/107,135, entitled "Storage and Retrieval System Transport Vehicle" filed on Jan. 23, 2015, the disclosures of which are incorporated by reference herein in their entireties. The bots 110 may be configured to place case units, such as the above described retail merchandise, into picking stock in the one or more levels of the storage structure 130 and then selectively retrieve ordered case units.

The bots 110, lift modules 150 and other suitable features of the storage and retrieval system 100 are controlled by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces PF (see FIG. 6, e.g. one or more case units that are movable as a unit and handled as a unit by components of the storage and retrieval system), and interfacing with a warehouse management system 2500. For simplicity and ease of explanation the term "case unit(s)" is generally used herein for referring to both individual case units and pickfaces (e.g. more than one case that is moved or otherwise handled as a unit).

Referring also to FIGS. 1A and 1B the rack module array RMA of the storage structure 130 includes vertical support members 1212 and horizontal support members 1200 that define a high density automated storage array as will be described in greater detail below. Rails 1200S may be mounted to one or more of the vertical and horizontal support members 1212, 1200 in, for example, picking aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and slats 1210S) provided at differing heights so as to form multiple shelf levels 130LS1-130LS4 between the storage or deck levels 130L defined by the transfer decks 130B. Accordingly, there are multiple rack shelf levels 130LS1-130LS4, corresponding to each storage level 130L, extending along one or more picking aisles 130A communicating with the transfer deck 130B of the respective storage level 130L. As may be realized, the multiple rack shelf levels 130LS1-130LS4 effect each storage level 130L having stacks of stored case units (or case layers) that are accessible from a common deck 1200S of a respective storage level 130L (e.g. the stacks of stored cases are located between storage levels).

As may be realized, bots 110 traversing a picking aisle 130A, at a corresponding storage level 130L, have access (e.g. for picking and placing case units) to each storage space 130S that is available on each shelf level 130LS1-130LS4, where each shelf level 130LS1-130LS4 is located between the storage levels 130L on one or more side PAS1, PAS2 (FIG. 1C) of the picking aisle 130A. As noted above, each of the storage shelf levels 130LS1-130LS4 is accessible by the bot 110 from the rails 1200S (e.g. from a common picking aisle deck 1200S that corresponds with a transfer deck 130B on a respective storage level 130L). As can be seen in FIGS. 1A and 1B there are one or more shelf rails 1210 vertically spaced (e.g. in the Z direction) from one another to form multiple stacked storage spaces 130S each being accessible by the bot 110 from the common rails 1200S. As may be realized, the horizontal support members 1200 also form shelf rails (in addition to shelf rails 1210) on which case units are placed.

Each shelf level 130LS1-130LS4 defines an open and undeterministic two dimensional storage surface (e.g. having a case unit support plane CUSP as shown in FIG. 1B) that facilitates a dynamic allocation of pickfaces both longitudinally (i.e. along a length the aisle or coincident with a path of bot travel defined by the picking aisle) and laterally (i.e. transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. As such, case unit (or tote) pickfaces of variable lengths and widths are positioned at each two dimensional storage location on the storage shelves (e.g. on each storage shelf level 130LS1-130LS4) with minimum gaps (e.g. that effect picking/placing of case units free from contact with other case units stored on the shelves) between adjacent stored case units/storage spaces.

In one aspect of the disclosed embodiment a vertical pitch between rack shelf levels 130LS1-130LS4 (that correspond to each storage level 130L) is varied so that a height Z1A-Z1E between the shelves is different, rather than equal. In other aspects, as shown in FIG. 1E, the vertical pitch P1 between at least some of the rack shelves is the same so that the height Z1A-Z1E between at least some shelves is equal while the vertical pitch P3 between other shelves is different. In still other aspects, as can be seen in FIG. 1E, the pitch of rack shelf levels 130LS1-130LS4 on one storage level 130L2 is a constant pitch P1 (e.g. the rack shelf levels are substantially equally spaced in the Z direction) while the pitch of rack shelf levels 130LS1-130LS4 on a different storage level 130L1 have a different constant pitch P2.

In one aspect, the storage space(s) 130S defined by the storage shelf levels 130LS1-130LS4 between the storage or deck levels 130L accommodates case units of different heights, lengths, widths and/or weights at the different shelf levels 130LS1-130LS4. For example, referring to FIGS. 1F and 3 the storage level 130L includes storage sections having at least one intermediate shelf. In the example shown, one storage section includes one intermediate shelf 1210A while another storage section includes two intermediate shelves 1210B, 1210C for forming shelf levels 130LS1-130LS4. In one aspect the pitch Z1 between storage levels 130L is any suitable pitch such as, for example, about 32 inches to about 34 inches while in other aspects the pitch is more than about 34 inches and/or less than about 32 inches. Any suitable number of shelves may be provided between the decks 1200S of adjacent vertically stacked storage levels 130L where the shelves have the same or differing pitches between the shelves (see e.g. FIG. 3 where case units CUD1, CUD2, CUE1-CUE3, CUF1, CUF2 are located in a vertical stack on one side of the picking aisle and case units CUA, CUB, CUC are located in a vertical stack on an opposite side of the picking aisle on storage shelves having a substantially similar pitch). For example, still referring to FIG. 1F, one section of the storage level 130L includes two storage shelves where one shelf has a pitch of Z1A and the other shelf has a pitch of Z1B where Z1A and Z1B are different from each other. This differing pitch allows for the placement of case units CUD, CUE having differing heights Z5, Z6 in a stack one above the other on a common storage level 130L. In other aspects pitches Z1A, Z1B may be substantially the same. In this aspect the storage level 130L includes another storage section that has three storage shelves where one shelf has a pitch of Z2, one storage shelf has a pitch of Z3 and the other storage shelf has a pitch of Z4 where Z2, Z3 and Z4 are different from each other. In other aspects at least two of the pitches Z2, Z3 and Z4 are substantially the same. In one aspect the pitch between the shelves is arranged so that larger and/or heavier case units CUC, CUE are arranged closer to the deck 1200S than smaller and/or lighter case units CUD, CUA, CUB. In other aspects the pitch between the shelves is arranged so that the case units are arranged in any suitable positions that may or may not be related to case unit size and weight.

In one aspect of the disclosed embodiment the storage or deck levels 130L (e.g. the surface on which the bots 110 travel) are arranged at any suitable predetermined pitch Z1 that is not, for example, an integer multiple of the intermediate shelf pitch(es) Z1A-Z1E. In other aspects the pitch Z1 may be an integer multiple of the intermediate shelf pitch, such as for example, the shelf pitch may be substantially equal to the pitch Z1 so that the corresponding storage space has a height substantially equal to the pitch Z1. As may be realized, the shelf pitch Z1A-Z1E is substantially decoupled from the storage level pitch 130L and corresponds to general case unit heights Z2-Z6 as illustrated in FIG. 1F. In one aspect of the disclosed embodiment case units of different heights are dynamically allocated or otherwise distributed along each aisle within a storage space 130S having a shelf height commensurate with the case unit height. The remaining space between the storage levels 130L, both along the length of the aisle coincident with the stored case unit (e.g. in the X direction) and alongside the stored case unit, being freely usable for dynamic allocation for cases of a corresponding height. As may be realized, the dynamic allocation of case units having different heights onto shelves having different pitches provides for stored case layers of different heights, between storage levels 130L on both sides of each picking aisle 130A, with each case unit being dynamically distributed along a common picking aisle 130A so that each case unit within each stored case layer being independently accessible (e.g. for picking/placing) by the bot in the common aisle. This placement/allocation of case units and the arrangement of the storage shelves provides maximum efficiency of storage space/volume use between the storage levels 130L, and hence of maximum efficiency of the rack module array RMA, with optimized distribution of case unit SKU's as each aisle length may include multiple case units of different heights, yet each rack shelf at least shelf level may be filled by dynamic allocation/distribution (e.g. to fill the three dimensional rack module array RMA space in length, width and height, to provide a high density storage array).

In one aspect of the disclosed embodiment, still referring to FIG. 1F, the rack shelves 1210A-1210C (inclusive of the rack shelf formed by rail 1200) are sectioned SECA, SECB longitudinally (e.g. along the length of the picking aisle 130A in the X direction, with respect to a storage structure frame of reference REF2) to form ordered or otherwise matched rack shelf sections along each picking aisle 130A. The aisle shelf sections SECA, SECB are ordered/matched to each other based on, for example, a pick sequence of a bot 110 traversing the aisle in a common pass picking case units destined for a common order fill (e.g. based on the order out sequence). In other words, a bot 110 makes a single pass (e.g. traversal in a single direction) down a single or common picking aisle while picking one or more case units from aisle shelf sections SECA, SECB on a common side of the picking aisle 130A to build a pickface on the bot 110 where the pickface includes case units that are arranged on the bot according to the order fill/order out sequence as will be described in greater detail below. Each of the aisle rack sections SECA, SECB includes intermediate shelves in the manner described above. In other aspects some of the aisle shelves do not include intermediate shelves while others do include intermediate shelves.

In one aspect, the ordered aisle rack sections SECA, SECB include shelf pitches that are different between sections SECA, SECB. For example, as can be seen in FIG. 1F aisle rack section SECA has shelves with pitches Z1C-Z1E while aisle rack section SECB has shelves with pitches Z1B, Z1A. In accordance with the aspects of the disclosed embodiment, the pitch Z1A-Z1E of at least one intermediate shelf 1210A-1210C of one aisle rack section SECA, SECB is related to the pitch Z1A-Z1E of at least one intermediate shelf 1210A-1210C of another of the ordered aisle rack sections SECA, SECB of the common picking aisle 130A. The different pitches Z1A-Z1E of the intermediate shelves 1210A-1210C in the ordered aisle rack section SECA, SECB are selected so as to be related and to effect multiple (at least two) ordered picks (i.e. picks in an ordered sequence) with a bot 110, in accordance with a mixed SKU load out sequence (e.g. palletizing to a common pallet load), from shelves of different pitches, from a common pass of a common picking aisle 130A. As may be realized, the mixed load output from the storage and retrieval system 100 (e.g. to fill a truck loadport/pallet load) is sequenced in a predetermined order according to various load out picking aisles (e.g. aisles from which case units are picked for transfer to an outgoing pallet) and the shelf pitch in the ordered sections SECA, SECB facilitate a bot 110 pick of more than one case unit in ordered sequence according to an order of the load out sequence in a common picking aisle pass (e.g. more than one case unit is picked in a predetermined order from a common picking aisle in one pass of the common picking aisle). The different aisle shelf pitches Z1A-Z1E of the ordered rack sections SECA, SECB are so related to increase the probability of such an ordered multi-pick (the picking of two or more case units from a single aisle with a single pass of the aisle as described above) so that the multi-pick is performed by each bot order fulfillment pass along each aisle, and so related such that more than a majority of cases picked in the storage and retrieval system 100 by the bots 110 and destined for a common load out (e.g. a common pallet load) are picked by a common bot 110 in an ordered sequence corresponding to the load out sequence during a single pass of a common picking aisle (e.g. the two or more cases picked by the bot 110 are picked from the same picking aisle in a single pass, e.g. the bot travels in a single direction once through the picking aisle). As may be realized, in one aspect of the disclosed embodiment both sides PAS1, PAS2 (FIG. 1C) of the picking aisle 130A have ordered aisle rack sections SECA-SECH where one ordered section may be matched with one or more sections on the same side PAS1, PAS2 of the common picking aisle 130A. As may be realized, the matched aisle rack sections may be located adjacent one another or spaced apart from one another along the picking aisle 130A.

Figure 2:
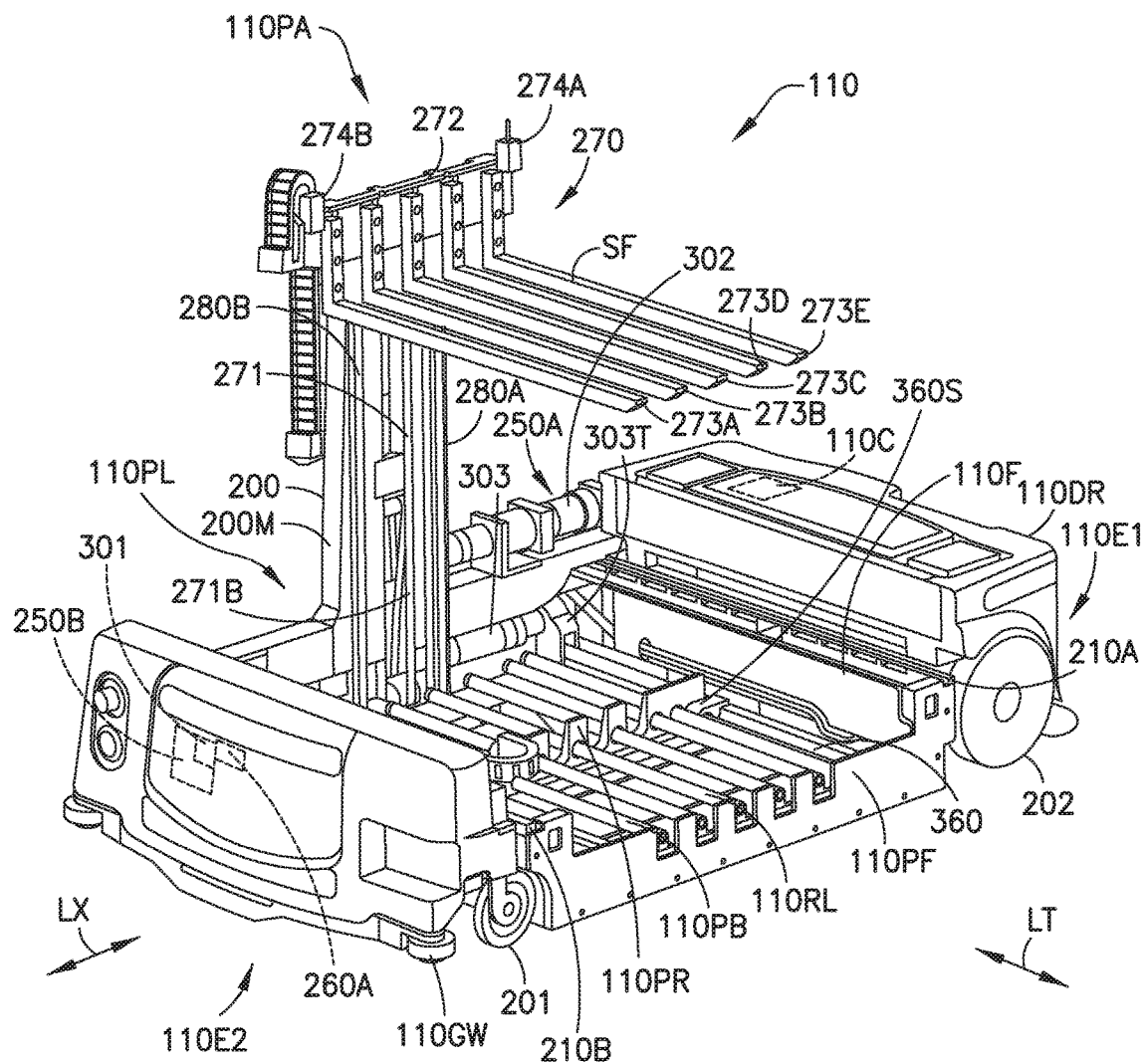
FIG. 2 is a schematic illustration of a transport vehicle in accordance with aspects of the disclosed embodiment.
Figure 3:
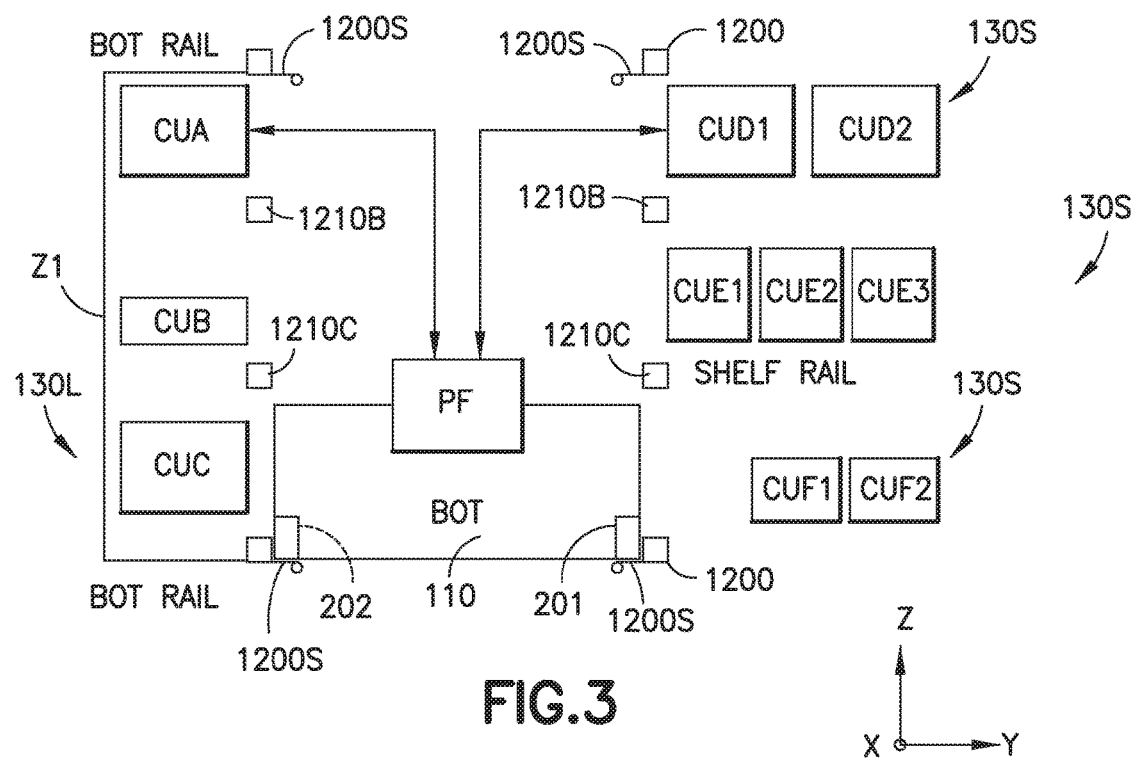
FIG. 3 is a schematic illustration of a portion of the storage and retrieval system in accordance with aspects of the disclosed embodiment.

Referring now to FIGS. 2 and 3, as noted above, the bot 110 includes a transfer arm 110PA that effects the picking and placement of case units from the stacked storage spaces 130S defined at least in part, in the Z direction) by the rails 1210A-1210C, 1200 (e.g. where the storage spaces may be further defined in the X and Y directions through the dynamic allocation of the case units as described above). The bots 110, as noted above, transport case units between each lift module 150 and each storage space 130S on a respective storage level 130L. The bots 110 include a frame 110F having a drive section 110DR and a payload section 110PL. The drive section 110DR includes one or more drive wheel motors each connected to a respective drive wheel(s) 202. In this aspect the bot 110 includes two drive wheels 202 located on opposite sides of the bot 110 at end 110E1 (e.g. first longitudinal end) of the bot 110 for supporting the bot 110 on a suitable drive surface however, in other aspects any suitable number of drive wheels are provided on the bot 110. In one aspect each drive wheel 202 is independently controlled so that the bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the bot 110 at end 110E2 (e.g. second longitudinal end) of the bot 110 for supporting the bot 110 on the drive surface. In one aspect the wheels 201 are caster wheels that freely rotate allowing the bot 110 to pivot through differential rotation of the drive wheels 202 for changing a travel direction of the bot 110. In other aspects the wheels 201 are steerable wheels that turn under control of, for example, a bot controller 110C (which is configured to effect control of the bot 110 as described herein) for changing a travel direction of the bot 110. In one aspect the bot 110 includes one or more guide wheels 110GW located at, for example, one or more corners of the frame 110F. The guide wheels 110GW may interface with the storage structure 130, such as guide rails (not shown) within the picking aisles 130A, on the transfer deck 130B and/or at transfer stations for interfacing with the lift modules 150 for guiding the bot 110 and/or positioning the bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety. As noted above, the bots 110 may enter the picking aisles 130A having different facing directions for accessing storage spaces 130S located on both sides of the picking aisles 130A. For example, the bot 110 may enter a picking aisle 130A with end 110E2 leading the direction of travel or the bot may enter the picking aisle 130A with end 110E1 leading the direction of travel.

The payload section 110PL of the bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX of the bot 110) to the frame 110F so that one or more case units carried within the payload section 110PL can be longitudinally moved (e.g. justified with respect to a predetermined location of the frame/payload section and/or a datum reference of one or more case units) along the longitudinal axis of the bot, e.g., to position the case unit at a predetermined position within the payload section 110PL and/or relative to other case units within the payload section 110PL (e.g. longitudinal forward/aft justification of case units). In one aspect the rollers 110RL may be driven (e.g. rotated about their respective axes) by any suitable motor for moving the case units within the payload section 110PL. In other aspects the bot 110 includes one or more longitudinally movable pusher bar (not shown) for pushing the case units over the rollers 110RL for moving the case unit(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated herein by reference in its entirety. The pusher bar 110PR is movable in the Y direction, relative to the bot 110 reference frame REF to effect, along with the fence 110PF and or pick head 270 of the transfer arm 110PA, a lateral justification of case unit(s) within the payload area 110PL in the manner described in U.S. provisional patent application No. 62/107,135, entitled "Storage and Retrieval System Transport Vehicle" filed on Jan. 23, 2015, previously incorporated herein by reference in its entirety.

Still referring to FIG. 2, the case units are placed on the payload bed 110PB and removed from the payload bed 110PB with the transfer arm 110PA. The transfer arm 110PA includes a lift mechanism or unit 200 located substantially within the payload section 110PL as described in, for example, U.S. provisional patent application No. 62/107,135, entitled "Storage and Retrieval System Transport Vehicle" filed on Jan. 23, 2015, previously incorporated herein by reference in its entirety. The lift mechanism 200 provides both gross and fine positioning of pickfaces carried by the bot 110 which are to be lifted vertically into position in the storage structure 130 for picking and/or placing the pickfaces and/or individual case units to the storage spaces 130S (e.g. on a respective storage level 130L on which the bot 110 is located). For example, the lift mechanism 200 provides for picking and placing case units at the multiple elevated storage shelf levels 130LS1-130LS4 accessible from the common picking aisle deck 1200S (see e.g. FIGS. 1A and 3 and as described above).

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku or multi-pick payloads are handled by the bot. In one aspect, the actuation of the lifting mechanism 200 is independent of actuation of the pusher bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle deck as described above.

The lifting mechanism may be configured in any suitable manner so that a pick head 270 of the bot 110 bi-directionally moves along the Z axis (e.g. reciprocates in the Z direction—see FIG. 2). In one aspect, the lifting mechanism includes a mast 200M and the pick head 270 is movably mounted to the mast 200M in any suitable manner. The mast is movably mounted to the frame in any suitable manner so as to be movable along the lateral axis LT (e.g. in the Y direction) of the bot 110. In one aspect the frame includes guide rails 210A, 210B to which the mast 200 is slidably mounted. A transfer arm drive 250A, 250B may be mounted to the frame for effecting at least movement of the transfer arm 110PA along the lateral axis LT (e.g. Y axis) and the Z axis. Referring to FIGS. 2, 2A and 3, in one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A, a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which the pick head 270 is mounted for guided movement in the Z direction along the guide rails 280A, 280B. In other aspects the pick head is mounted to the mast in any suitable manner for guided movement in the Z direction. With respect to the transmissions 271, a belt 271B of the belt and pulley transmission 271 is fixedly coupled to the pick head 270 so that as the belt 271 moves (e.g. is driven by the motor 302) the pick head 270 moves with the belt 271 and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction. The transmission 260A for the extension motor 301 is substantially similar to that described herein with respect to transmission 271.

Figure 10:
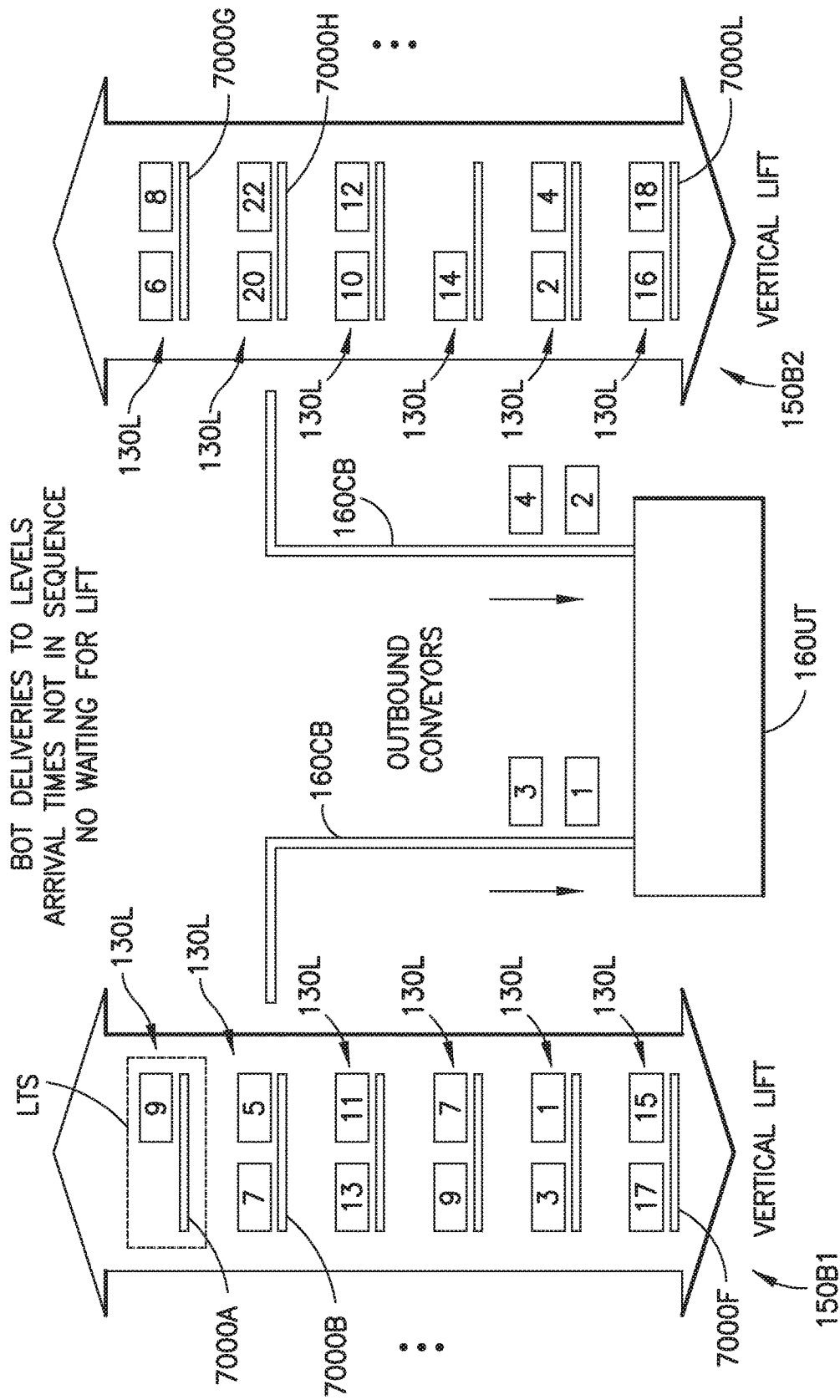
FIG. 10 is a schematic illustration of a portion of the storage and retrieval system in accordance with aspects of the disclosed embodiment.

Still referring to FIG. 2 the pick head 270 of the bot 110 transfers case units between the bot 110 and a case unit pick/place location such as, for example, the storage spaces 130S and/or interface shelves 7000A-7000L of lift interface/transfer stations LTS (see FIG. 10) between the bot 110 and a lift module(s) 150. In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 1B, the tines 273A-273E are configured for insertion between slats 1210S that form the case unit support plane CUSP of the storage shelves.

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units) to and from the bot 110 and as many as five tines 273A-273E to transfer larger sized case units (and/or groups of case units) to and from the bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the bot 110 without disturbing other case units on, for example, the storage shelves has a width of about the distance X1 between slats 1210S (see FIG. 1B).

Figure 4:
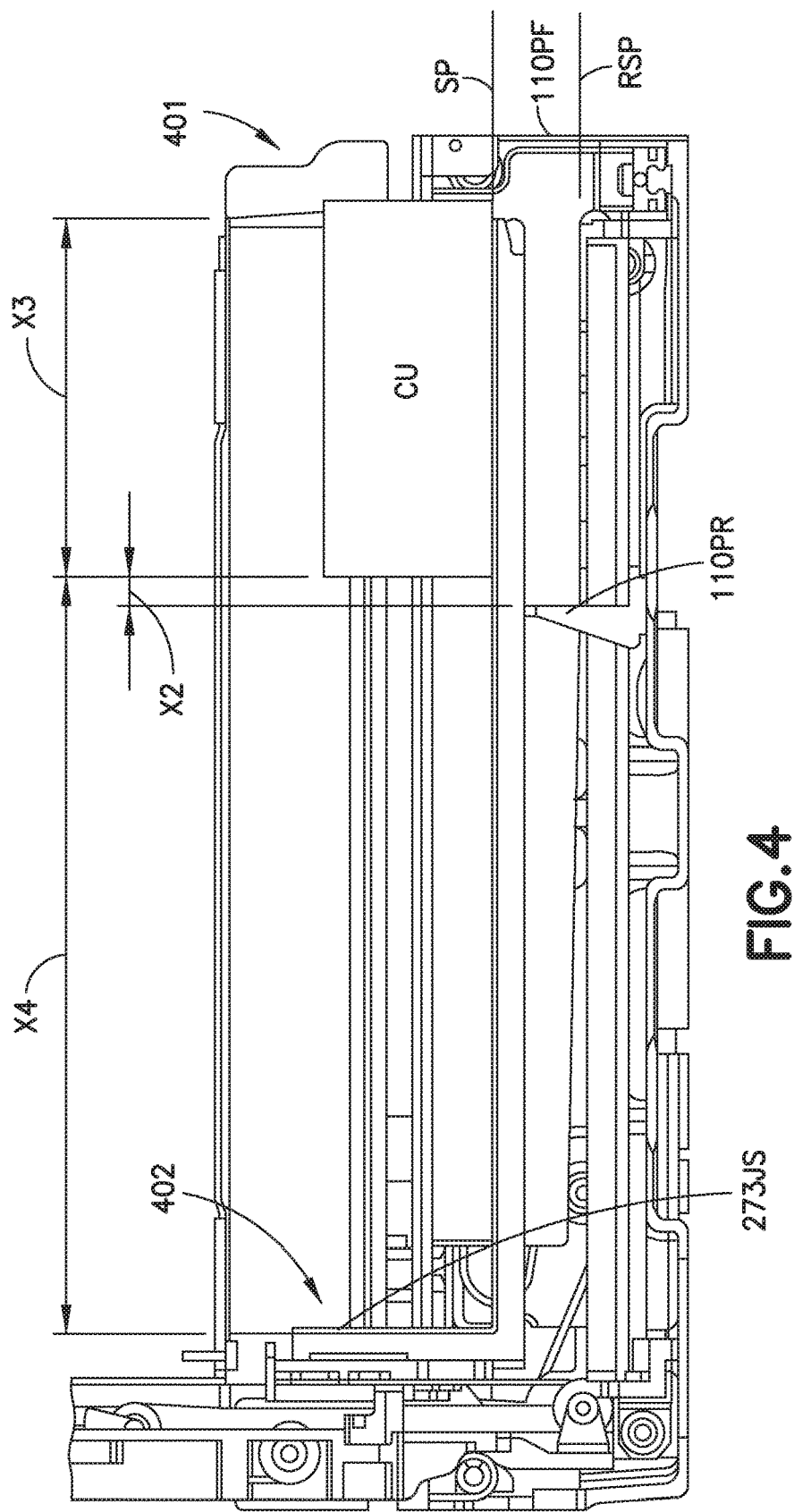
FIGS. 4-9 are schematic illustrations of portions of the transport vehicle in accordance with aspects of the disclosed embodiment.

The immovable tines 373B-373D are used when transferring all sizes of case units (and/or pickfaces) while the movable tines 373A, 373E are selectively raised and lowered (e.g. in the Z direction with the actuators 274A, 274B) relative to the immovable tines 373B-373D to transfer larger case units (and/or pickfaces). Still referring to FIG. 2 an example is shown where all of the tines 273A-273E are positioned so that a case unit support surface SF of each tine 273A-273E is coincident with a picking plane SP (FIG. 4) of the pick head 270. As may be realized, in other aspects the two end tines 273A, 273E are positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units carried by the pick head 270 and do not interfere with any unpicked case units positioned in storage spaces 130S on the storage shelves or any other suitable case unit holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIG. 2 there is one actuator 274A, 274B for each of the movable tines 273A, 273E so that each moveable tine is independently movable in the Z direction. In other aspects one actuator may be coupled to more than one movable tine so that the more than one movable tine move as a unit in the Z direction.

As may be realized, movably mounting one or more tines 273A-273E on the base member 272 of the pick head 270 provides for full support of large case units and/or pickfaces on the pick head 270 while also providing the ability to pick and place small case units without interfering with other case units positioned on, for example, the storage shelves. The ability to pick and place variably sized case units without interfering with other case units on the storage shelves reduces a size of a gap GP (see FIG. 1A) between case units on the storage shelves. As may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A.

Referring again to FIG. 2, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor and the transmission 303T is a belt and pulley transmission. In other aspects the pusher bar 110PR may be actuated by a linear actuator having substantially no rotary components.

Figure 6:
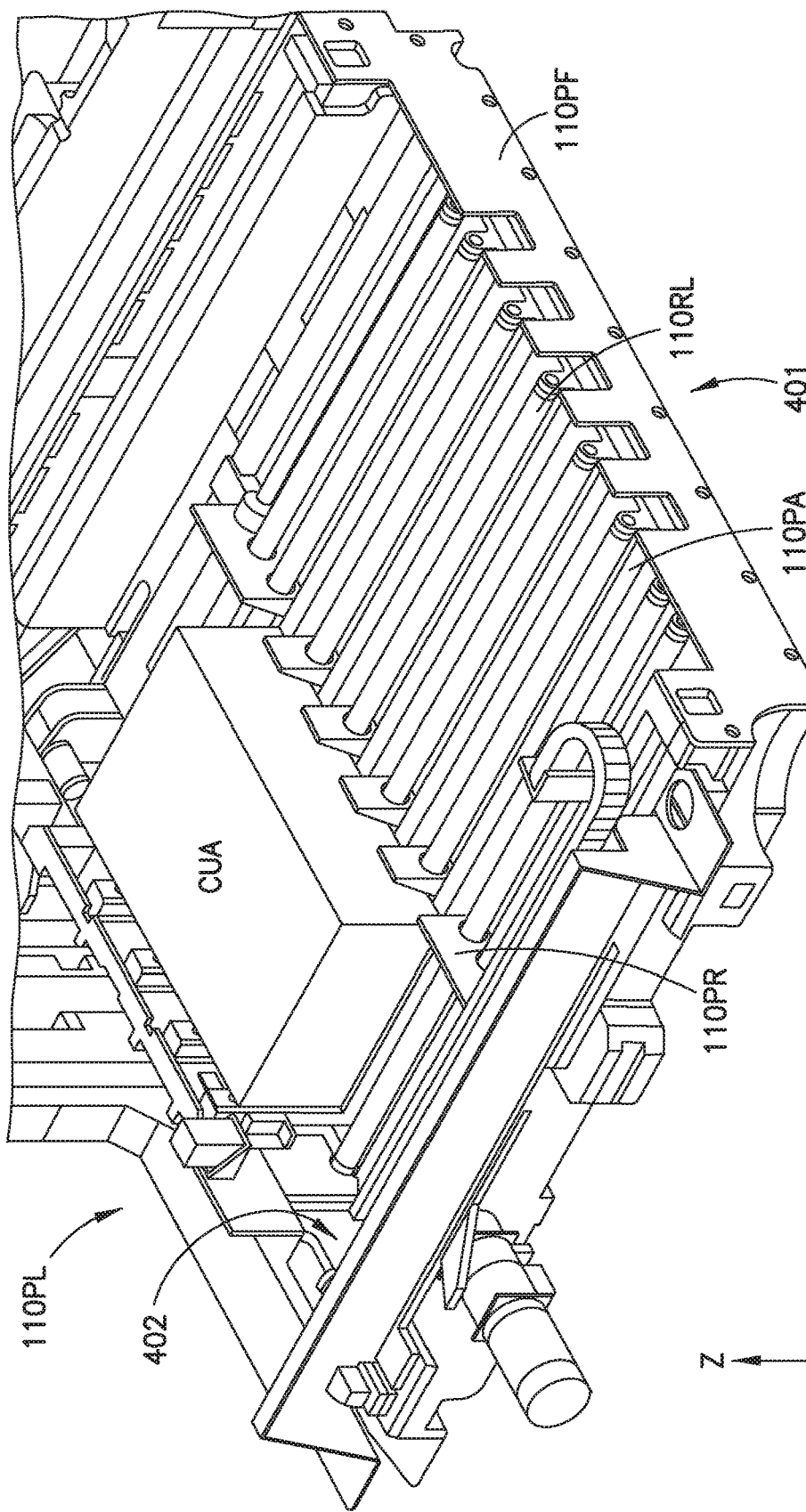

The pusher bar 110PR is arranged within the payload section 110PL so as to be substantially perpendicular to the rollers 110RL and so that the pusher bar 110PR does not interfere with the pick head 270. As can be seen in FIG. 6, the bot 110 is in a transport configuration where at least one case unit would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP (see FIG. 4) of the rollers 110RL. The pusher bar 110PR is configured with slots 351 (FIG. 7) into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110PR, extension of the transfer arm 110PA in the transverse direction (e.g. Y direction) and the lifting/lowering of the pick head 270.

Figure 5:
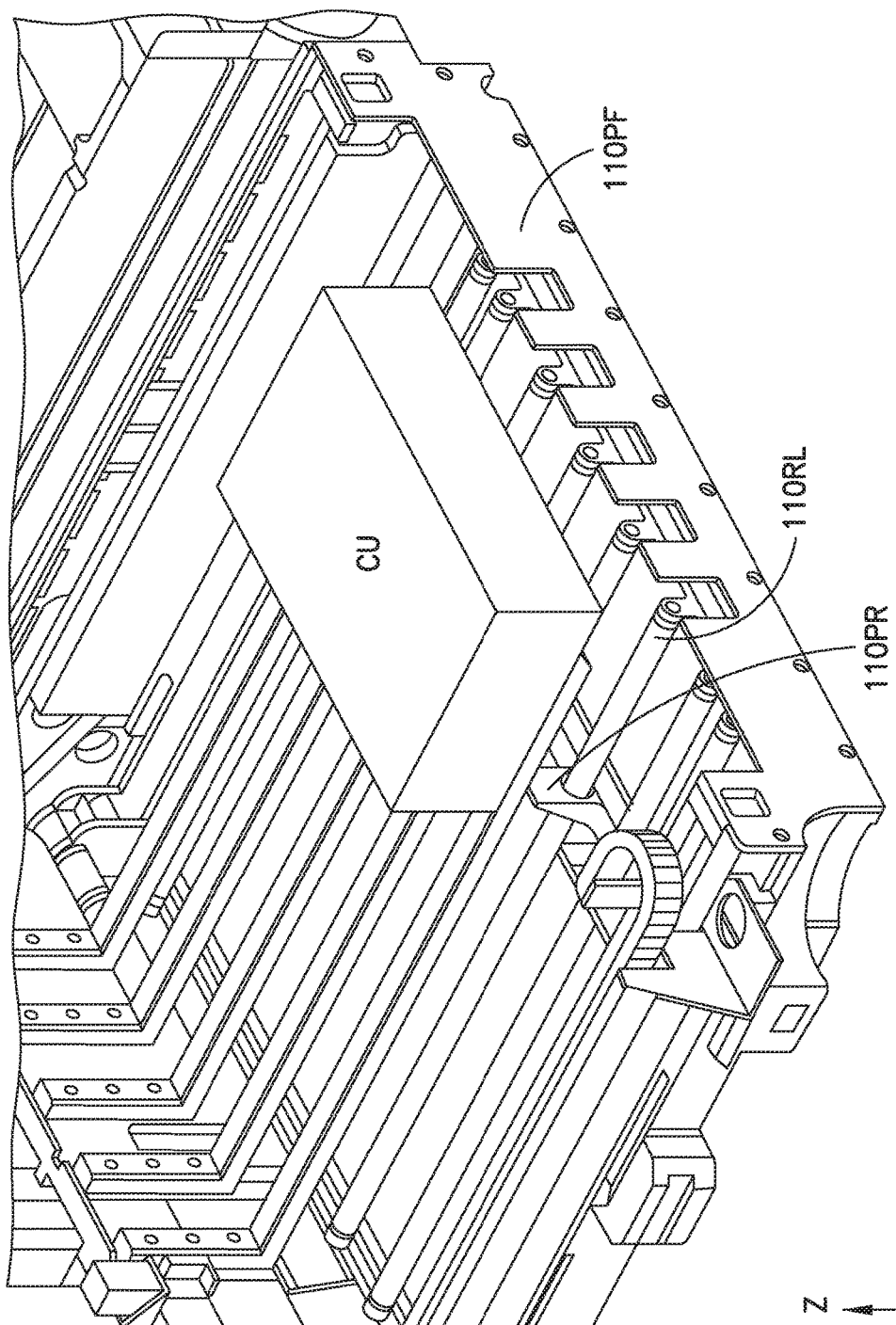
Figure 11:
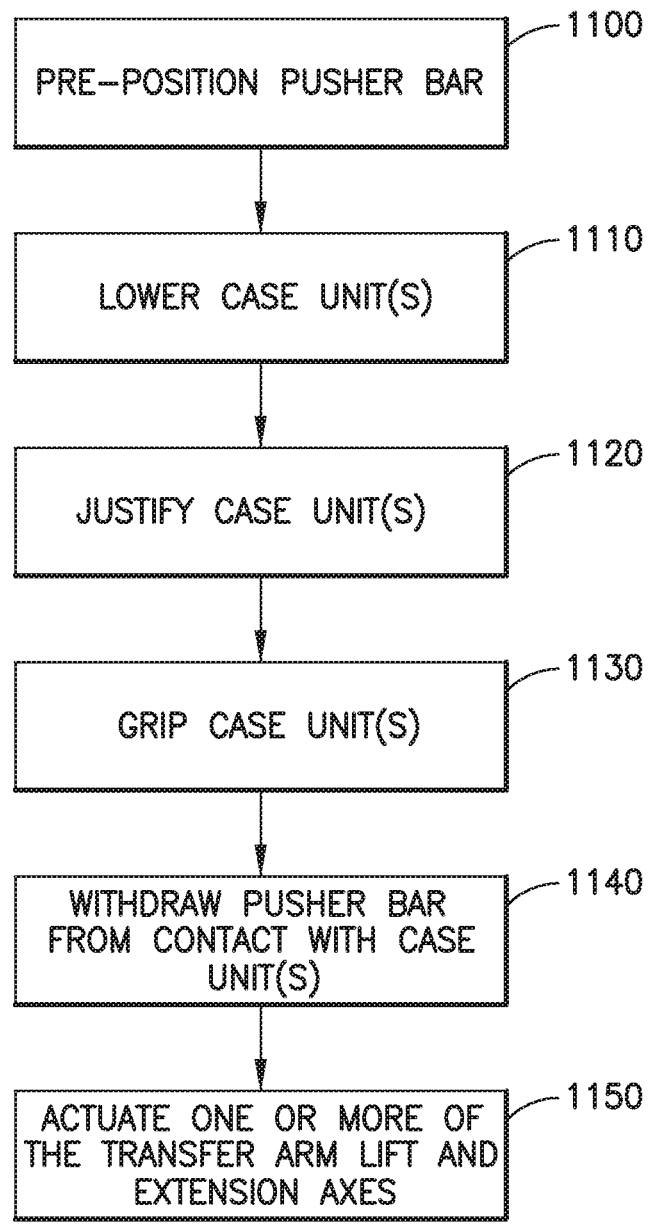
FIGS. 11-14 are exemplary flow diagrams in accordance with aspects of the disclosed embodiment.

As noted above, because the pusher bar 110PR is a separate, standalone axis of the bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput and effects the ordered (e.g. according to the predetermined load out sequence) multi-pick of two or more case units from a common picking aisle, in one common pass of the picking aisle. For example, referring to FIGS. 4-5, during a transfer arm 110PA multi-pick/place sequence the pusher bar 110PR is prepositioned (as the case unit(s) and/or pickface are being picked and transferred into the payload section 110PL) to a location that is a predetermined distance X2 away from the contact depth X3 (e.g. the depth of the tines occupied by the case unit(s) and/or pickface CU when being picked/placed from a storage space or other case unit holding location) (FIG. 11, Block 1100). The distance X2 is a minimized distance that only allows sufficient clearance between pusher bar 110PR and the case unit(s) to allow the case unit(s) to be seated on the rollers 110RL. As the case unit(s) CU are lowered onto the rollers 110RL (FIG. 11, Block 1110) the distance travelled by the pusher bar 110PR to contact the case unit(s) CU is a shorter distance X2 when compared to moving from a back side 402 (relative to the lateral direction and an access side 401 of the payload section 110PL) of the payload section 110PL a distance X4 as with conventional transport vehicles. When the case unit(s) CU are lowered by the transfer arm 110PA and transferred to the rollers 110RL so as to be solely supported by the rollers 110RL, the pusher bar 110PR is actuated to forward (relative to the lateral direction and an access side 401 of the payload section 110PL) justify the case unit(s) CU (FIG. 11, Block 1120). For example, the pusher bar 110PB may push the case unit(s) CU laterally in the Y direction so that the case unit(s) contact the fence 110PF (which is located at the access side 401 of the payload section 110PL so that a case unit reference datum may be formed through contact between the case unit(s) CU and the fence 110PF. In one aspect the pusher bar 110PR may engage or otherwise grip the case unit(s) CU during transport of the case units (e.g. so as to hold the case unit(s) against the fence 110PF) for maintaining the case unit(s) CU in a predetermined spatial relationship with each other and a reference frame REF (FIG. 2) of the bot 110 (FIG. 11, Block 1130). When placing the case unit(s) the pusher bar 110PR, after justifying the case unit(s) CU against the fence 110PF, is withdrawn (e.g. in the Y direction) from contact with the case unit(s) CU (FIG. 11, Block 1140). Substantially immediately after the pusher bar 110PR disengages the case unit(s) CU one or more of the lift axis (e.g. in the Z direction) and extension axis (e.g. in the Y direction) of the transfer arm 110PA are actuated substantially simultaneously with the withdrawing movement of the pusher bar 110PR (FIG. 11, Block 1150). In one aspect both the lift and extension axes are actuated when the pusher bar is withdrawn from contact with the case unit(s) CU while in other aspect one of the lift and extension axes is actuated. As may be realized, the simultaneous movement of the transfer arm 110PA lift axis and/or extension axis with the withdrawal of the pusher bar 110PR as well as the decreased distance the pusher moves to justify the case unit(s) CU decreases the time needed to transfer case unit(s) CU to and from the bot 110 and increases throughput of the storage and retrieval system 100.

Figure 12:
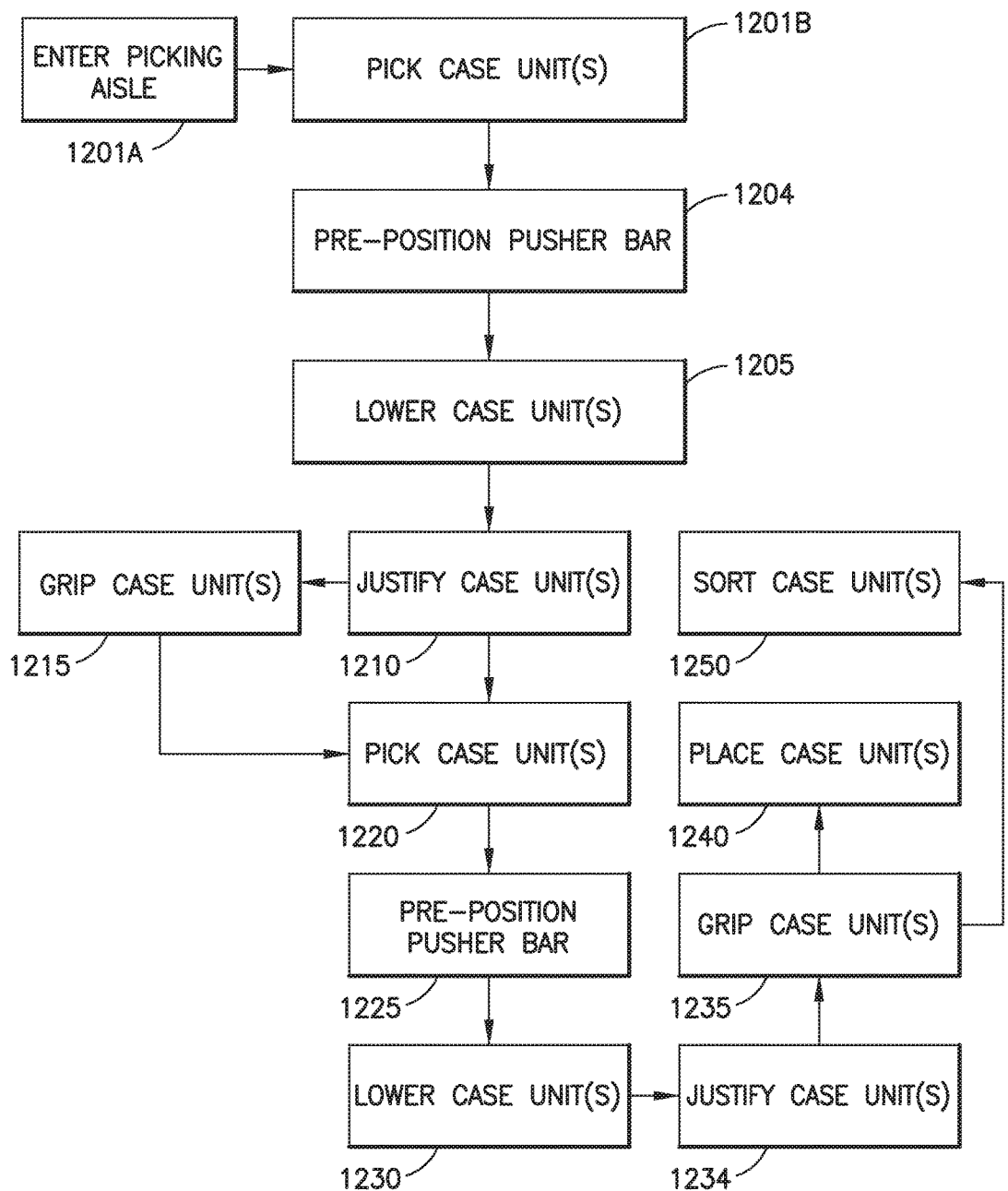

In another aspect of the disclosed embodiment, as may be realized, in the multi-pick/place sequence multiple case units are substantially simultaneously carried and manipulated within the payload section 110PL to further increase throughput of the storage and retrieval system 100 and to effect the multi-pick/place sequence in accordance with a predetermined order out sequence. Referring also to FIG. 1C, the bot receives pick and place commands from, for example, control server 120 (and/or warehouse management system 2500) and the bot controller 110C executes those commands for forming the ordered multi-pick. Here the bot 110 enters the common aisle 130A1 from, for example, the transfer deck 130B for making a single or common pass through the picking aisle 130A1 during which the bot 110 picks two or more case units according to the predetermined order out sequence (FIG. 12, Block 1201A). In one aspect the manipulation of the case units CU is a sorting of the case units (in other words picking and placing of case units according to the predetermined load out sequence) where the cases are positioned on the transfer arm 110PA for picking/placement of the case units and/or positioned so that the case units are not transferred and remain on the transfer arm 110PA while other case units are transferred to and from the transfer arm 110PA. Here, the bot 110 travels through the common picking aisle 130A1 in the direction of arrow XC and stops at a predetermined storage space 130S1, according to the predetermined order out sequence, where the bot 110 picks one or more case units from the predetermined storage space 130S1 with a common transfer arm 110PA where placement of the case units on the common transfer arm 110PA corresponds to the predetermined order out sequence as will be described in greater detail below (e.g. the case units are sorted on-the-fly, e.g. during transport, with the bot 110).

As an example of case manipulation on the bot 110, referring also to FIGS. 6-9, case unit(s) CUA may be picked from a case unit holding location (e.g. such as storage spaces 130S in a common picking aisle for effecting the ordered multi-pick, and in other aspects from a lift transfer station LTS, see FIG. 1C, and/or a case unit buffer station located in a picking aisle or on the transfer deck) and transferred into the payload section 110PL (FIG. 12, Block 1201B). As the case unit(s) CUA is being transferred into the payload section 110PL the pusher bar 110PR may be pre-positioned (FIG. 12, Block 1204) adjacent the fence 110PF so that the pusher bar 110PR is positioned between the case unit(s) CUA and the fence 110PF when the case unit(s) CUA is lowered for transfer to the rollers 110RL (FIG. 12, Block 1205). The pusher bar 110PR is actuated to push the case unit(s) CUA (resting on the rollers 110RL) in the Y direction towards the back (e.g. rear) 402 of the payload section 110PL so that the case unit(s) CUA contacts a justification surface 273JS (FIG. 4) of the tines 273A-273E and is justified to the back 402 of the payload section 110PL (FIG. 12, Block 1210).

Figure 7:
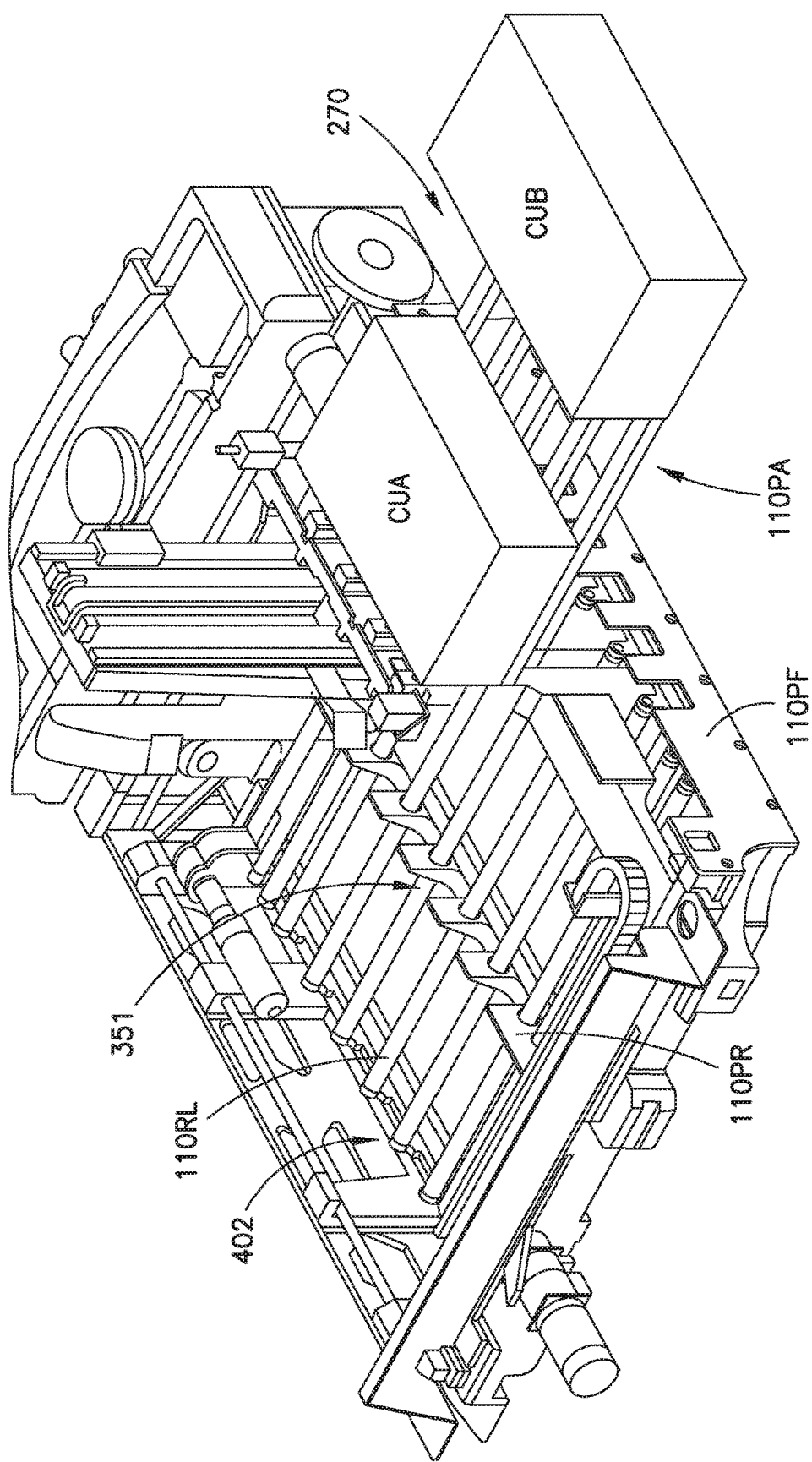
Figure 8:
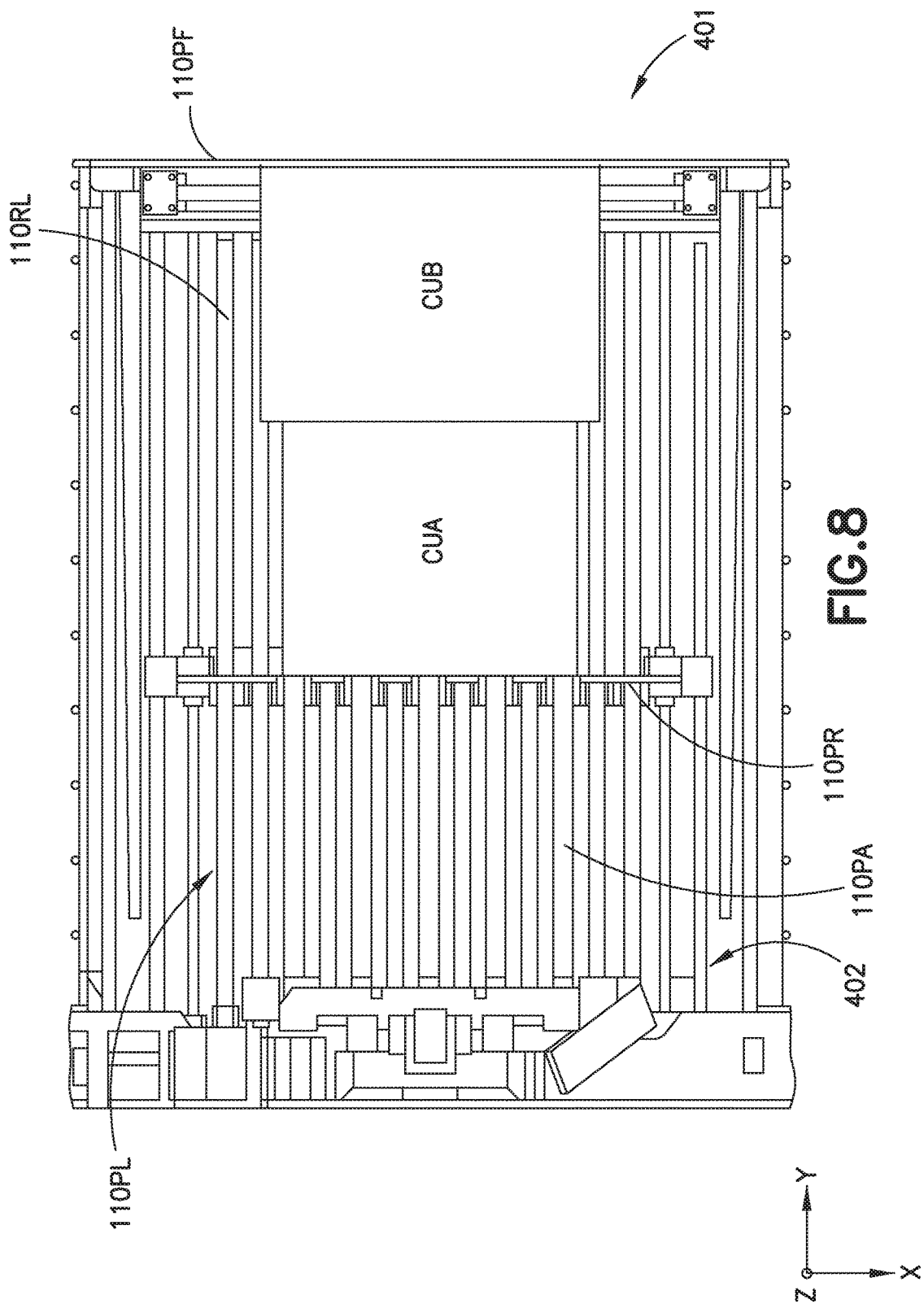
Figure 9:
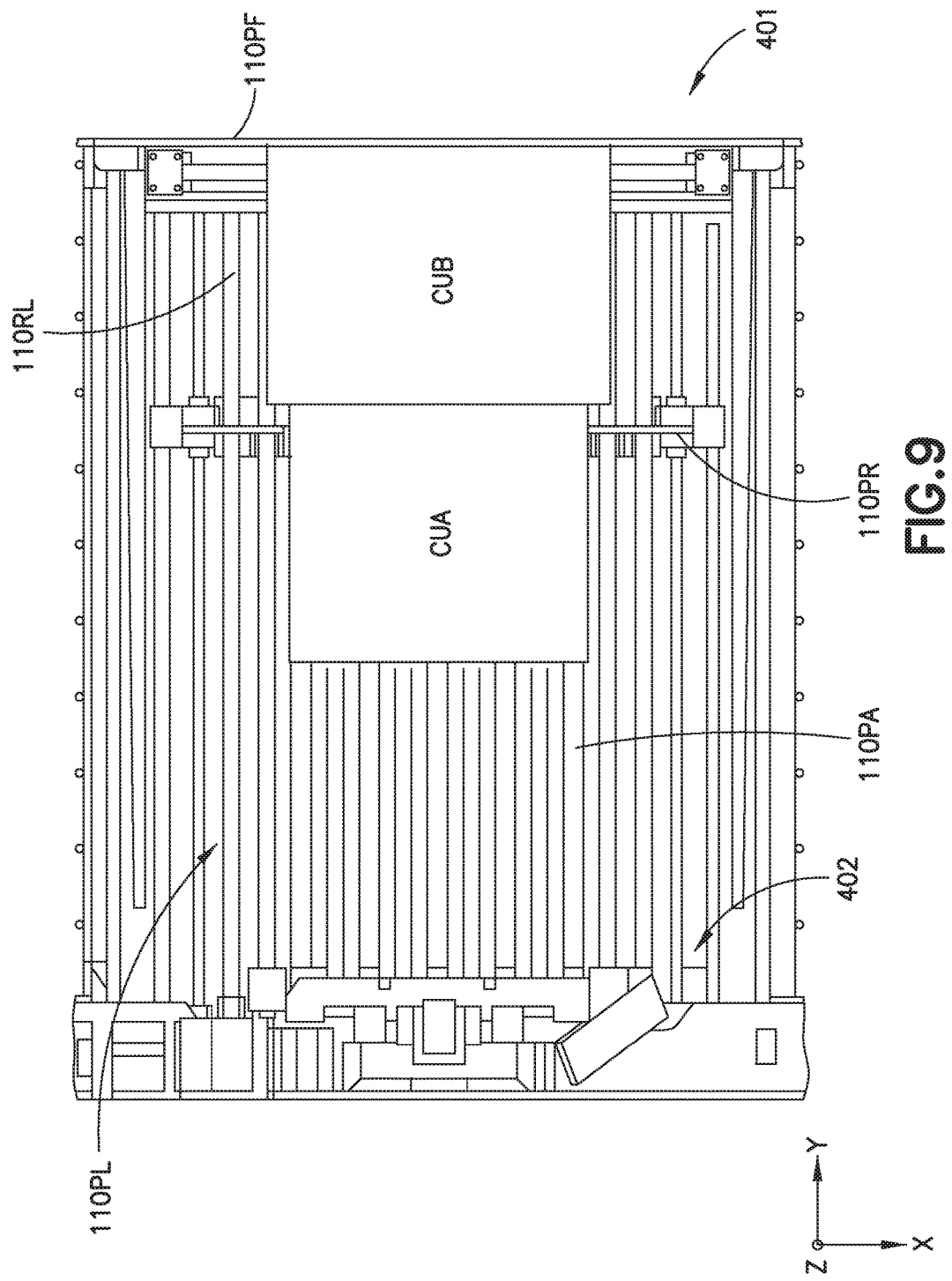
Figure 13:
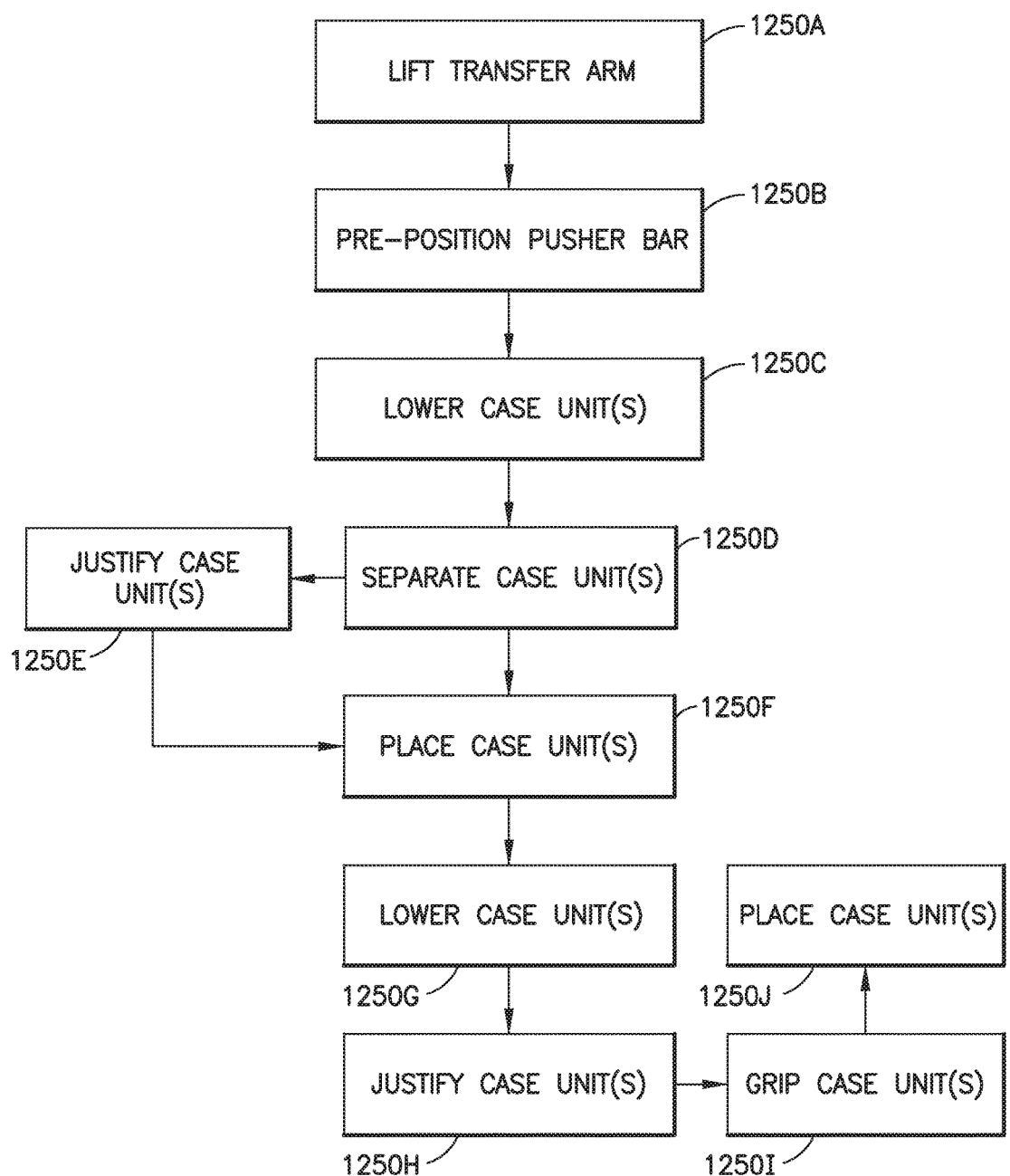

In one aspect, the bot 110 continues to traverse the common picking aisle 130A1 in the same direction XC (e.g. so that all of the case units in the ordered multi-pick are picked in the common pass of the picking aisle with the bot 110 travelling in a single direction) and stops at another predetermined storage space 130S according to the predetermined order out sequence. As noted above, the pusher bar 110PR remains in contact with (e.g. grips) the case unit(s) CUA during transport of the case unit(s) between case unit holding locations so that the case unit(s) CUA remains in a predetermined location at the back 402 of the payload section 110PL (and/or at a predetermined location longitudinally) relative to the reference frame REF of the bot 110 (FIG. 12, Block 1215). To pick subsequent case units, from for example, the other storage space 130S2 of the common picking aisle 130A1 the pusher bar 110PR is moved in the Y direction to disengage the case unit(s) CUA and the lift and extension axes of the transfer arm 110PA are actuated to retrieve another case unit(s) CUB from the other storage space 130S2 (or in other aspects from e.g. a lift transfer station LTS and/or a buffer station as noted above) (FIG. 12, Block 1220). While the case unit(s) CUB are being picked the pusher bar 110PR is positioned in the Y direction adjacent the back 402 of the payload section 110PL so as to be located between the case units CUA and the justification surface 273JS of the tines 273A-273E (FIG. 12, Block 1225). The case unit(s) CUB are transferred into the payload section and lowered/placed on the rollers 110RL (FIG. 12, Block 1230) so that the case units CUA, CUB are arranged relative to each other along the Y axis. The pusher bar 110PR is actuated in the Y direction to push the case units CUA, CUB towards the fence 110PF to forward justify the case units CUA, CUB (FIG. 12, Block 1234) and grip/hold the case units CUA, CUB for transport (FIG. 12, Block 1235). As may be realized, in one aspect the case units CUA, CUB are placed at a case unit holding location together as a unit while in other aspects the case units CUA, CUB are sorted, e.g. transported to and placed at separate positions of a common case unit holding location or at different case unit holding locations (FIG. 12, Block 1240) as will be described in greater detail below. For example, referring also to FIG. 10, the bot 110 carrying the ordered multi-pick payload transfers the case units of the ordered multi-pick to one or more transfer stations LTS (which include buffer shelves 7000A-7000L) of output lifts 150B1, 150B2. Where the case units of the multi-pick are placed at different positions of, for example, a common buffer or transfer shelf 7000A-7000L or a transfer station LTS of the lifts 150B1, 150B2 the bot 110 places a first one of the case units CUB (corresponding to, for exemplary purposes pickface 7 in FIG. 10 which in this example includes a single case unit) in a first position of the buffer shelf 7000B and places the second one of the case units CUA (corresponding to, for exemplary purposes pickface 5 in FIG. 10 which in this example includes a single case unit) in a second position of the buffer shelf 7000B. Where the case units of the multi-pick are placed at a common case unit holding location the bot 110 places both case units CUA, CUB as a unit at for example, a common position of buffer shelf 7000A (corresponding to, for exemplary purposes pickface 9 in FIG. 10 which in this example, includes two case units)

Where the case units CUA, CUB are sorted (FIG. 12, Block 1250) for placement at separate positions of a common case holding location or at different case holding locations, the case units CUA, CUB are separated from each other in the payload section 110PL. For example, the pick head 270 of the transfer arm 110PA may be moved in the Z direction to lift the case units CUA, CUB from the rollers 110RL by an amount sufficient to allow the pusher bar 110PR to pass beneath the case unit(s) (FIG. 13, Block 1250A). As the case units CUA, CUB are lifted the pusher bar 110PR is positioned along the Y direction so as to be located between the case units CUA, CUB (see FIG. 9) (FIG. 13, Block 1250B). The pick head 270 is lowered so that the case units CUA, CUB are transferred to the rollers 110RL and so that the pusher bar is inserted between the case units CUA, CUB (FIG. 13, Block 1250C). The pusher bar 110PR is moved in the Y direction (e.g. to separate the case unit(s)) to move case unit(s) CUA towards the back 402 of the payload section 110PL (e.g. against the justification surface 273JS of the tines 273A-273E or any other suitable position) while the case unit(s) CUB remain at the front of the payload section 110PL adjacent the fence 110PF (e.g. as shown in FIG. 7) (FIG. 13, Block 1250D). As may be realized, where the case units are held against the justification surface 273JS of the tines during transport, the pusher bar is moved in the Y direction (e.g. to separate the case unit(s)) to move case unit(s) CUB towards the front 401 of the payload section 110PL (e.g. against the fence 110PF or any other suitable position) while the case unit(s) CUA remain at the back of the payload section 110PL adjacent the justification surface 273JS. The pusher bar 110PR may also be moved in the Y direction to re-justify the case unit(s) CUB against the fence 110PF to position the case unit(s) on the tines 273A-273E for placement at a case unit holding location (FIG. 13, Block 1250E). As may be realized, with the case unit(s) CUA being positioned substantially against the justification surface 273JS of the tines 273A-273E (e.g. of the pick head 270) the case unit(s) CUB can be placed at a case unit holding location substantially without interference from the case unit(s) CUA (FIG. 13, Block 1250F), e.g. the case unit CUA is free from contacting case units disposed at the case unit holding location. The case unit(s) CUA is lowered/transferred back into the payload section 110PL (e.g. by retracting and lowering the transfer arm 110PA) (FIG. 13, Block 1250G). The pusher bar 110PR, which is pre-positioned between the justification surface 273JS and the case unit(s) CUA, pushes the case unit(s) CUA, which is disposed on the rollers 110RL, against the fence 110PF to forward justify the case unit(s) CUA for placement at another case unit holding location (e.g. different than the holding location that case unit(s) CUB were placed) (FIG. 13, Block 1250H). The pusher bar 110PR remains against the case unit(s) CUA for gripping (e.g. with the fence) the case unit(s) during transport to the other case unit holding location (FIG. 13, Block 1250I). The pusher bar 110PR moves away from the case unit(s) CUA and the transfer arm is actuated to lift and extend the pick head 270 for placing the case unit(s) CUA at the other case unit holding location (FIG. 13, Block 1250J).

Figure 14:
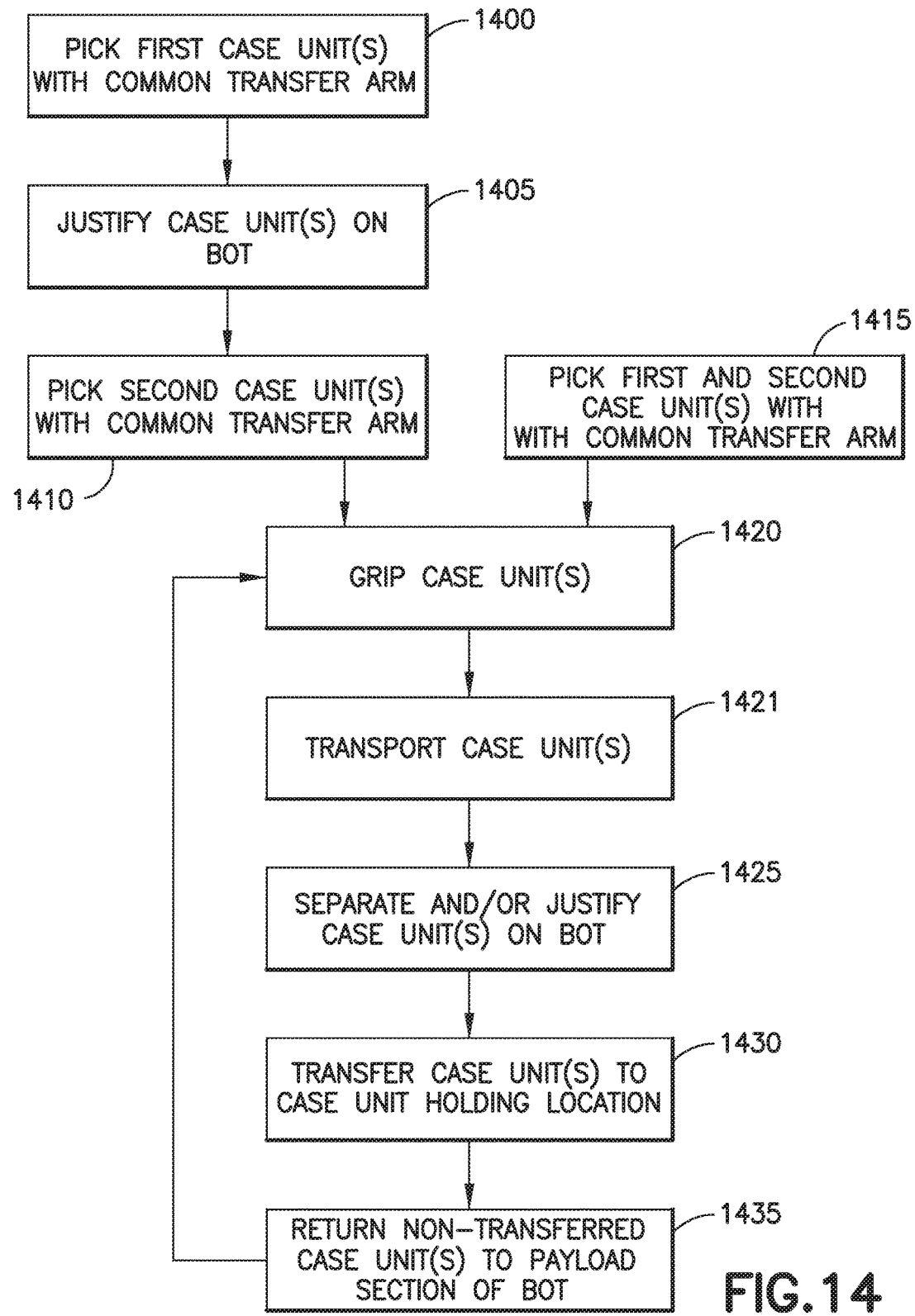

An example of a case unit(s) multi-pick and place operation with on the fly sortation of the case units for creating a mixed pallet load MPL (as shown in FIG. 1D) and/or to fill a customer order bag, tote or other container TOT at an operator station 160EP (as shown in FIG. 15) according to a predetermined order out sequence will be described with respect to FIG. 1C in accordance with an aspect of the disclosed embodiment. For example, assuming customer orders require case unit(s) 7 to be delivered to output lift 150B1 and case units 5 to also be delivered to output lift 150B1 (in other aspects, it is noted that customer orders may require case units carried by a common bot 110 to be delivered to different output lifts 150B1, 150B2 such that the transfer of the case units carried by the common bot 110 to different output lifts occurs in a manner substantially similar to that described herein), the bot 110 enters picking aisle 130A1 and picks case unit 7 from storage space 130S1 in the manner described above with respect to FIGS. 11-13 (FIG. 14, Block 1400). The case unit(s) 7 is justified on the bot 110 towards the rear of the payload section 110PL as described above (FIG. 14, Block 1405). The bot 110 continues to travel through the picking aisle 130A1 in a common pass of the picking aisle and picks case unit 5 from a different storage space 130S2 with the common transfer arm 110PA so that both case unit(s) 7, 5 are located adjacent one another on the common transfer arm 110PA (FIG. 14, Block 1410). In other aspects both case units 7, 5 are picked as a unit by the common transfer arm 110PA from a common storage space 130S3, such as from picking aisle 130A2 (FIG. 14, Block 1415). As may be realized, in one aspect, the controller 110C is configured to effect picking of the case unit(s) in an order that is opposite an order in which the case unit(s) are placed.

In this multi-pick example, the case unit holding location(s) correspond to storage spaces 130S of the picking aisles 130 but in other aspects the case unit holding location(s) include input lift modules 150A1, 150A2 (where a direct transfer between bots and the lift occurs), transfer or buffer stations LTS for interfacing with the input lift modules 150A1, 150A2, (where an indirect transfer between the lift modules and the bots occurs) and storage spaces 130S1-130S4 (picking from the transfer stations LTS and the input lift modules with the bot is noted where case units are needed for a predetermined order out sequence are not located in the storage spaces 130S but are being input into the storage rack array in a just in time manner to be delivered substantially directly to the output lift(s) 150B1, 150B2.

The bot 110 grips both case units 7, 5 within the payload section 110PL in the manner described above and exits the picking aisle 130A1 (FIG. 14, Block 1420). The bot travels along the transfer deck 130B and interfaces with output lift 150B1 (FIG. 14, Block 1421). The bot separates the case units 7, 5 within the payload section 110PL, as described above, so that case unit(s) 5 is justified towards the front of the payload section 110PL and case unit(s) 7 is justified towards the back of the payload section 110PL (FIG. 14, Block 1425). The case unit 5 is transferred to the output lift 150B1 directly by the bot 110 (e.g. the pick head 270 of the bot interfaces directly with a shelf of the lift) or indirectly such as through the transfer/buffer station LTS shelf 7000B (the case unit is transferred to the station LTS and the station interfaces with the shelf of the lift) (FIG. 14, Block 1430). The bot retracts the transfer arm 110PA to return the case unit(s) 7 to the payload section 110PL (FIG. 14, Block 1435) and grips the case unit CUC (FIG. 14, Block 1420). The case unit(s) CUC is transported to a second position of output lift 150B1 (FIG. 14, Block 1421), justified toward the front of the payload section 110PL (FIG. 14, Block 1425), as described above, and transferred to output lift 150B1 either directly or indirectly, as described above (FIG. 14, Block 1430). In other aspects, depending on the predetermined case unit output sequence, the bot 110 places both case unit(s) 7, 5 at a common location/position, such as at one of output lifts 150B1, 150B2. For example, pickface 20 on shelf 7000H comprises both case units 7, 5 such that the bot 110 places both case units as a multi-case unit pickface at a single position of shelf 7000H.

The output lifts 150B1, 150B2 transfer the ordered multi-pick(s) placed on the shelves 7000A-7000L by the bots 110 to the output station 160UT also in accordance with the predetermined order out sequence. For example, still referring to FIG. 10, the pickfaces 1-22 are picked by the lifts 150B1, 150B2 in sequenced order so that the pickfaces 1-22 are delivered to the output station 160UT in the predetermined order needed to form the mixed pallet load MPL and/or to fill a customer order bag, tote or other container TOT at an operator station 160EP.

Figure 16:
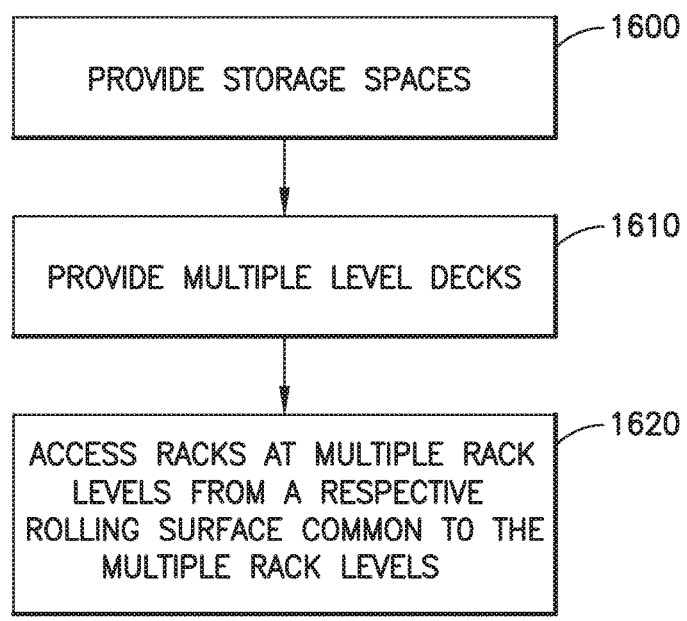
FIG. 16 is an exemplary flow diagram in accordance with aspects of the disclosed embodiment.

Referring to FIG. 16, in accordance with aspects of the disclosed embodiment, in a method for filling orders, storage spaces are arrayed on racks along picking aisles (FIG. 16, Block 1600). Multiple level decks are also provided (FIG. 16, Block 1610), where at least one deck level of the multiple level decks communicates with each aisle, where the multiple level decks and aisles define a rolling surface for an autonomous transport vehicle at each level of the multiple level decks. Racks at multiple rack levels are accessed from a respective rolling surface that is common to the multiple rack levels (FIG. 16, Block 1620), where the racks are disposed along at least one aisle at each level of the multiple level decks. In one aspect, a vertical pitch between rack levels varies for a portion of a respective aisle. In one aspect, the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass. In one aspect, the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, a storage array in an automated storage and retrieval system includes storage spaces arrayed on racks along picking aisles; multiple level decks, where at least one deck level of the multiple level decks communicates with each aisle, where the multiple level decks and aisles are configured to define a rolling surface for an autonomous transport vehicle at each level of the multiple level decks, racks along at least one aisle at each level of the multiple level decks are at multiple rack levels that are accessed from a respective rolling surface that is common to the multiple rack levels, and a vertical pitch between rack levels varies for a portion of a respective aisle; wherein the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass.

In accordance with one or more aspects of the disclosed embodiment, the autonomous transport vehicle effects multiple picks of mixed cases in the common aisle pass.

In accordance with one or more aspects of the disclosed embodiment, the multiple deck levels are disposed on both ends of the picking aisles.

In accordance with one or more aspects of the disclosed embodiment, a portion of the rolling surface defined by the multiple level decks is configured for undeterministic traverse the autonomous transport vehicle across and along the rolling surface.

In accordance with one or more aspects of the disclosed embodiment, the storage array further includes one or more vertical lifts in communication with at least one of the multiple level decks, the one or more vertical lifts being configured to, at least in part, transfer stored items to and from the storage spaces.

In accordance with one or more aspects of the disclosed embodiment, each of the multiple rack levels define an open and undeterministic storage surface facilitating a dynamic allocation of pickfaces at each of the multiple rack levels.

In accordance with one or more aspects of the disclosed embodiment, the multiple level decks are arranged at a pitch that is not an integer multiple of the vertical pitch of the rack levels.

In accordance with one or more aspects of the disclosed embodiment, a storage array in an automated storage and retrieval system includes storage spaces arrayed on racks along picking aisles; multiple level decks, where at least one level deck of the multiple level decks communicates with each aisle, where the multiple level decks and aisles are configured to define a rolling surface for an autonomous transport vehicle at each level of the multiple deck levels, racks along at least one aisle at each level of the multiple level decks are at multiple rack levels that are accessed from a respective rolling surface that is common to the multiple rack levels, and a vertical pitch between rack levels varies for a portion of a respective aisle; wherein the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, the multiple deck levels are disposed on both ends of the picking aisles.

In accordance with one or more aspects of the disclosed embodiment, a portion of the rolling surface defined by the multiple level decks is configured for undeterministic traverse the autonomous transport vehicle across and along the rolling surface.

In accordance with one or more aspects of the disclosed embodiment, the storage array further includes one or more vertical lifts in communication with at least one of the multiple level decks, the one or more vertical lifts being configured to, at least in part, transfer stored items to and from the storage spaces.

In accordance with one or more aspects of the disclosed embodiment, each of the multiple rack levels define an open and undeterministic storage surface facilitating a dynamic allocation of pickfaces at each of the multiple rack levels.

In accordance with one or more aspects of the disclosed embodiment, the multiple level decks are arranged at a pitch that is not an integer multiple of the vertical pitch of the rack levels.

In accordance with one or more aspects of the disclosed embodiment, a method for filling an order includes providing storage spaces arrayed on racks along picking aisles; providing multiple level decks, where at least one deck level of the multiple level decks communicates with each aisle, where the multiple level decks and aisles define a rolling surface for an autonomous transport vehicle at each level of the multiple level decks; and accessing racks at multiple rack levels, and disposed along at least one aisle at each level of the multiple level decks, from a respective rolling surface that is common to the multiple rack levels, where a vertical pitch between rack levels varies for a portion of a respective aisle; wherein the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass.

In accordance with one or more aspects of the disclosed embodiment, the method further includes effecting multiple picks of mixed cases in the common aisle pass with the autonomous transport vehicle.

In accordance with one or more aspects of the disclosed embodiment, the method further includes providing one or more vertical lifts in communication with at least one of the multiple level decks; and transferring, at least in part, stored items to and from the storage spaces with the one or more vertical lifts.

In accordance with one or more aspects of the disclosed embodiment, the method further includes defining, with each of the multiple rack levels, an open and undeterministic storage surface facilitating a dynamic allocation of pickfaces at each of the multiple rack levels.

In accordance with one or more aspects of the disclosed embodiment, a method for filling an order includes providing storage spaces arrayed on racks along picking aisles; providing multiple level decks, where at least one level deck of the multiple level decks communicates with each aisle, where the multiple level decks and aisles provide a rolling surface for an autonomous transport vehicle at each level of the multiple deck levels; and accessing racks at multiple rack levels, and disposed along at least one aisle at each level of the multiple level decks, from a respective rolling surface that is common to the multiple rack levels, where a vertical pitch between rack levels varies for a portion of a respective aisle; wherein the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, the method further includes providing one or more vertical lifts in communication with at least one of the multiple level decks; and transferring, at least in part, stored items to and from the storage spaces with the one or more vertical lifts.

In accordance with one or more aspects of the disclosed embodiment, the method further includes defining, with each of the multiple rack levels, an open and undeterministic storage surface facilitating a dynamic allocation of pickfaces at each of the multiple rack levels.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A storage array in an automated storage and retrieval system, the storage array comprising:
   stacked picking aisles, each of the stacked picking aisles being disposed at stacked aisle levels;
   storage spaces arrayed on racks along the stacked picking aisles;
   at least one deck in communication with each of the stacked picking aisles, where
   the at least one deck and at least one of the stacked picking aisles are configured to define a rolling surface for an autonomous transport vehicle at each level of the at least one deck,
   the racks along the at least one picking aisle at each level of the at least one deck are at multiple rack levels that are accessed from a respective rolling surface that is common to the multiple rack levels, and
   a vertical pitch between rack levels varies for a portion of a respective picking aisle;
   wherein the vertical pitch between at least two rack levels of the portion of the respective picking aisle is related to another vertical pitch between at least two other rack levels of another picking aisle portion of the respective picking aisle so that the autonomous transport vehicle effects multiple picks in an ordered sequence in a common pass of one or more respective picking aisle on a common level of the at least one deck.

2. The storage array of claim 1, wherein the autonomous transport vehicle effects multiple picks of mixed cases in the common pass of one or more respective picking aisle.

3. The storage array of claim 1, wherein the at least one deck is disposed on both ends of the picking aisles.

4. The storage array of claim 1, wherein a portion of the rolling surface defined by the at least one deck is configured for undeterministic traverse of the autonomous transport vehicle across and along the rolling surface.

5. The storage array of claim 1, further comprising one or more vertical lifts in communication with the at least one deck, the one or more vertical lifts being configured to, at least in part, transfer stored items to and from the storage spaces.

6. The storage array of claim 1, wherein each of the multiple rack levels define an open and undeterministic storage surface facilitating a dynamic allocation of pickfaces at each of the multiple rack levels.

7. The storage array of claim 1, wherein the at least one deck includes multiple level decks that are arranged at a pitch that is not an integer multiple of the vertical pitch of the rack levels.

8. A storage array in an automated storage and retrieval system, the storage array comprising:
   stacked picking aisles disposed at stacked aisle levels;
   storage spaces arrayed on racks along each of the stacked picking aisles;
   at least one deck in communication with each of the stacked picking aisles on each aisle level, where the at least one deck and at least one of the stacked picking aisles are configured to define a rolling surface for an autonomous transport vehicle at each level of the at least one deck, the racks along at least one picking aisle at each level of the at least one deck are at multiple rack levels that are accessed from a respective rolling surface that is common to the multiple rack levels, and a vertical pitch between rack levels varies for a portion of a respective picking aisle;

wherein the vertical pitch between at least two rack levels of the portion of the respective picking aisle is related to another vertical pitch between at least two other rack levels of another picking aisle portion of one or more respective picking aisle accessed from the common rolling surface so that the vertical pitch and the other vertical pitch effects substantially filling a vertical space of the stacked aisle levels accessed from the common rolling surface with stored items.

9. The storage array of claim 8, wherein the at least one deck is disposed on both ends of the picking aisles.

10. The storage array of claim 8, wherein a portion of the rolling surface defined by the at least one deck is configured for undeterministic traverse of the autonomous transport vehicle across and along the rolling surface.

11. The storage array of claim 8, further comprising one or more vertical lifts in communication with the at least one deck, the one or more vertical lifts being configured to, at least in part, transfer stored items to and from the storage spaces.

12. The storage array of claim 8, wherein each of the multiple rack levels define an open and undeterministic storage surface facilitating a dynamic allocation of pickfaces at each of the multiple rack levels.

13. The storage array of claim 8, wherein the at least one deck includes multiple level decks that are arranged at a pitch that is not an integer multiple of the vertical pitch of the rack levels.

14. A method for filling an order comprising:
providing storage spaces arrayed on racks along stacked picking aisles, the stacked picking aisles being disposed at stacked aisle levels;

providing at least one deck that communicates with each of the stacked picking aisles on each aisle level, where the at least one deck and at least one of the stacked picking aisles define a rolling surface for an autonomous transport vehicle at each level of the at least one deck; and accessing racks at multiple rack levels, and disposed along the at least one of the stacked picking aisles at level of the at least one deck, from a respective rolling surface that is common to the multiple rack levels, where a vertical pitch between rack levels varies for a portion of a respective one of the stacked picking aisles;

wherein the vertical pitch between at least two rack levels of the portion of the respective one of the stacked picking aisles is related to another vertical pitch between at least two other rack levels of another picking aisle portion of the respective one of the stacked picking aisles so that the autonomous transport vehicle effects multiple picks in an ordered sequence in a common pass of one or more respective aisle on a common level of the at least one deck.

15. The method of claim 14, further comprising effecting multiple picks of mixed cases in the common pass of one or more respective aisle with the autonomous transport vehicle.

16. The method of claim 14, further comprising:
providing one or more vertical lifts in communication with the at least one deck; and transferring, at least in part, stored items to and from the storage spaces with the one or more vertical lifts.

17. The method of claim 14, further comprising defining, with each of the multiple rack levels, an open and undeterministic storage surface facilitating a dynamic allocation of pickfaces at each of the multiple rack levels.

18. A method for filling an order comprising:
providing storage spaces arrayed on racks along each stacked picking aisles, the stacked picking aisles disposed at stacked aisle levels;

providing at least one deck that communicates with each of the stacked picking aisles on each aisle level, where the at least one deck and the stacked picking aisles provide a rolling surface for an autonomous transport vehicle at each level of the at least one deck; and accessing racks at multiple rack levels, and disposed along at least one of the stacked picking aisles at each level of the at least one deck, from a respective rolling surface that is common to the multiple rack levels, where a vertical pitch between rack levels varies for a portion of a respective one of the stacked picking aisles;

wherein the vertical pitch between at least two rack levels of the portion of the respective one of the stacked picking aisles is related to another vertical pitch between at least two other rack levels of another aisle portion of one or more respective one of the stacked picking aisles accessed from the common rolling surface so that the vertical pitch and the other vertical pitch effects substantially filling a vertical space of the stacked aisle levels accessed from the common rolling surface with stored items.

19. The method of claim 18, further comprising:
providing one or more vertical lifts in communication with the at least one deck; and transferring, at least in part, stored items to and from the storage spaces with the one or more vertical lifts.

20. The method of claim 18, further comprising defining, with each of the multiple rack levels, an open and undeterministic storage surface facilitating a dynamic allocation of pickfaces at each of the multiple rack levels.

* * * * *